United States Patent
Nishimura et al.

(10) Patent No.: US 9,922,435 B2
(45) Date of Patent: Mar. 20, 2018

(54) DISPLAY SYSTEM, DISPLAY METHOD, AND COMPUTER-READABLE RECORDING MEDIUM

(71) Applicant: FUJITSU LIMITED, Kawasaki-shi, Kanagawa (JP)

(72) Inventors: Takehiko Nishimura, Kawasaki (JP); Kazuhiko Sunagawa, Musashino (JP); Ryota Sakaguchi, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 15/079,537

(22) Filed: Mar. 24, 2016

(65) Prior Publication Data

US 2016/0284109 A1    Sep. 29, 2016

(30) Foreign Application Priority Data

Mar. 25, 2015    (JP) ................................. 2015-063218

(51) Int. Cl.
  *G06T 11/20*    (2006.01)
  *G05B 23/02*    (2006.01)
  *G06Q 10/06*    (2012.01)

(52) U.S. Cl.
  CPC ........ *G06T 11/206* (2013.01); *G05B 23/0272* (2013.01); *G06Q 10/0639* (2013.01)

(58) Field of Classification Search
  None
  See application file for complete search history.

(56) References Cited

U.S. PATENT DOCUMENTS

2005/0216111 A1* 9/2005 Ooshima ................ G06Q 10/06
  700/99
2016/0104081 A1* 4/2016 Ho ..................... G06Q 10/0633
  705/7.27

FOREIGN PATENT DOCUMENTS

JP    2003-288070    10/2003
JP    2009-104502     5/2009

OTHER PUBLICATIONS

Fung ("A great visual of complicated schedules", 2014, http://junkcharts.typepad.com/junk_charts/2014/06/a-great-visual-of-complicated-schedules.html).*

* cited by examiner

*Primary Examiner* — Xin Sheng
(74) *Attorney, Agent, or Firm* — Fujitsu Patent Center

(57) ABSTRACT

A display system includes at least a display device. The display device includes a processor configured to execute a process including: identifying a processing period and a waiting period of a first device and a processing period and a waiting period of a second device based on log information of processing in the first device and log information of processing in the second device that performs processing subsequent to the first device; arranging the processing period and the waiting period of the first device identified on a first time axis that indicates changes of the processing period and the waiting period in the first device; calculating a distance between the first time axis and a second time axis; and displaying a graph in which transitions of the processing period and the waiting period are expressed with different band stripes based on the distance calculated.

12 Claims, 16 Drawing Sheets

| LOG NUMBER | TYPE | TIME | SOURCE | EVENT ID | EVENT |
|---|---|---|---|---|---|
| 14 | OPERATION | 2012/12/10 9:00:50 | DEVICE B | 0111 | END OF MANUFACTURING |
| 13 | OPERATION | 2012/12/10 9:00:45 | DEVICE A | 0111 | END OF MANUFACTURING |
| 12 | OPERATION | 2012/12/10 9:00:40 | DEVICE A | 0110 | START OF MANUFACTURING |
| 11 | OPERATION | 2012/12/10 9:00:35 | DEVICE B | 0110 | START OF MANUFACTURING |
| 10 | MANIPULATION | 2012/12/10 9:00:33 | MONITOR | 0320 | DISPLAY SWITCHING |
| 9 | OPERATION | 2012/12/10 9:00:30 | DEVICE B | 0111 | END OF MANUFACTURING |
| 8 | ERROR | 2012/12/10 9:00:27 | DEVICE B | 0231 | REQUIRING MATERIAL RESTOCKING |
| 7 | OPERATION | 2012/12/10 9:00:25 | DEVICE A | 0111 | END OF MANUFACTURING |
| 6 | OPERATION | 2012/12/10 9:00:20 | DEVICE A | 0110 | START OF MANUFACTURING |
| 5 | OPERATION | 2012/12/10 9:00:15 | DEVICE B | 0110 | START OF MANUFACTURING |
| 4 | ERROR | 2012/12/10 9:00:12 | DEVICE A | 0220 | OPERATION ERROR |
| 3 | MANIPULATION | 2012/12/10 9:00:09 | MONITOR | 0320 | DISPLAY SWITCHING |
| 2 | OPERATION | 2012/12/10 9:00:05 | DEVICE A | 0111 | END OF MANUFACTURING |
| 1 | OPERATION | 2012/12/10 9:00:00 | DEVICE A | 0110 | START OF MANUFACTURING |

FIG.3

| LOG NUMBER | TYPE | TIME | SOURCE | EVENT ID | EVENT | |
|---|---|---|---|---|---|---|
| 14 | OPERATION | 2012/12/10 9:00:50 | DEVICE B | 0111 | END OF MANUFACTURING | ⎫ 0:15 DEVICE B (PROCESSING PERIOD) |
| 13 | OPERATION | 2012/12/10 9:00:45 | DEVICE A | 0111 | END OF MANUFACTURING | 0:05 DEVICE A (PROCESSING PERIOD) |
| 12 | OPERATION | 2012/12/10 9:00:40 | DEVICE A | 0110 | START OF MANUFACTURING | ⎫ 0:05 DEVICE B (WAITING PERIOD) |
| 11 | OPERATION | 2012/12/10 9:00:35 | DEVICE B | 0110 | START OF MANUFACTURING | 0:15 DEVICE A (WAITING PERIOD) |
| 10 | MANIPULATION | 2012/12/10 9:00:33 | MONITOR | 0320 | DISPLAY SWITCHING | |
| 9 | OPERATION | 2012/12/10 9:00:30 | DEVICE B | 0111 | END OF MANUFACTURING | ⎫ 0:15 DEVICE B (PROCESSING PERIOD) |
| 8 | ERROR | 2012/12/10 9:00:27 | DEVICE B | 0231 | REQUIRING MATERIAL RESTOCKING | |
| 7 | OPERATION | 2012/12/10 9:00:25 | DEVICE A | 0111 | END OF MANUFACTURING | 0:05 DEVICE A (PROCESSING PERIOD) |
| 6 | OPERATION | 2012/12/10 9:00:20 | DEVICE A | 0110 | START OF MANUFACTURING | |
| 5 | OPERATION | 2012/12/10 9:00:15 | DEVICE B | 0110 | START OF MANUFACTURING | 0:15 DEVICE A (WAITING PERIOD) |
| 4 | ERROR | 2012/12/10 9:00:12 | DEVICE A | 0220 | OPERATION ERROR | |
| 3 | MANIPULATION | 2012/12/10 9:00:09 | MONITOR | 0320 | DISPLAY SWITCHING | |
| 2 | OPERATION | 2012/12/10 9:00:05 | DEVICE A | 0111 | END OF MANUFACTURING | 0:05 DEVICE A (PROCESSING PERIOD) |
| 1 | OPERATION | 2012/12/10 9:00:00 | DEVICE A | 0110 | START OF MANUFACTURING | |

221

| PRODUCT NUMBER | PROCESS E | | PROCESS F | | PROCESS G | |
|---|---|---|---|---|---|---|
| | START TIME | END TIME | START TIME | END TIME | START TIME | END TIME |
| SN0001 | 9:00:00 | 9:00:05 | 9:00:15 | 9:00:30 | 9:00:40 | 9:00:48 |
| SN0002 | 9:00:20 | 9:00:25 | 9:00:35 | 9:00:50 | 9:01:00 | 9:01:08 |
| SN0003 | 9:00:40 | 9:00:45 | 9:00:55 | 9:01:10 | 9:01:20 | 9:01:28 |
| SN0004 | 9:01:00 | 9:01:05 | 9:01:15 | 9:01:30 | 9:01:40 | 9:01:48 |
| SN0005 | 9:01:20 | 9:01:25 | 9:01:35 | 9:01:50 | 9:02:00 | 9:02:08 |
| SN0006 | 9:01:40 | 9:01:45 | 9:01:55 | 9:02:10 | 9:02:20 | 9:02:28 |
| ⋮ | ⋮ | ⋮ | ⋮ | ⋮ | ⋮ | ⋮ | ated by means of the elements and combi-
DISPLAY SYSTEM, DISPLAY METHOD, AND COMPUTER-READABLE RECORDING MEDIUM

CROSS-REFERENCE TO RELATED APPLICATION

This application is based upon and claims the benefit of priority of the prior Japanese Patent Application No. 2015-063218, filed on Mar. 25, 2015, the entire contents of which are incorporated herein by reference.

FIELD

The embodiments discussed herein are related to a display system, a display method, and a computer-readable recording medium.

BACKGROUND

Storing and utilizing data used in activities of a corporation have been practiced. For example, data such as operation logs of a manufacturing unit in an assembly line of a product is stored to be used for improvement of manufacturing processes. Moreover, when comparison analysis is performed with a plurality of trend graphs by superimposing waveforms thereof with each other, displaying a first waveform and a second waveform with an enlarged or a reduced display time range, with a fixed relative positional relationship of the first waveform and the second waveform has been proposed (Japanese Laid-open Patent Publication No. 2009-104502).

However, for example, when a graph is created using a time axis in each process in an assembly line of a product as a vertical line, and changes of the product being manufactured as a horizontal line, the trace graph that indicates the changes of the product lies flat if a displayed time range is enlarged. Accordingly, it is difficult to distinguish differences in angle formed by trace graphs corresponding to respective products relative to the time axis, and it is difficult to grasp a problem occurring in the assembly line.

SUMMARY

According to an aspect of the embodiments, a display system includes at least a display device. The display device includes a processor configured to execute a process including: identifying a processing period and a waiting period of a first device and a processing period and a waiting period of a second device based on log information of processing in the first device that is included in a manufacturing line and log information of processing in the second device that performs processing subsequent to the first device and that is included in the manufacturing line; arranging the processing period and the waiting period of the first device identified on a first time axis that indicates changes of the processing period and the waiting period in the first device, arranging the processing period and the waiting period in the second device identified on a second time axis that is parallel to the first time axis and that indicates changes of the processing period and the waiting period in the second device, and forming a first band and a second band, the first band connecting processing periods for a product common between the first device and the second device, the second band connecting waiting periods after processing of the product common between the first device and the second device; calculating a distance between the first time axis and the second time axis so that an angle of any one of the first band and the second band formed at the arranging is a predetermined angle relative to the first time axis or the second time axis or a combination thereof; and displaying a graph in which transitions of the processing period and the waiting period are expressed with different band stripes based on the distance calculated at the calculating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 depicts one example of a log storage unit;
FIG. 3 depicts one example of identification of a processing period and a waiting period.

DESCRIPTION OF EMBODIMENTS

Preferred embodiments will be explained with reference to accompanying drawings. The disclosed technique is not limited to the embodiments. Moreover, the embodiments described below may be appropriately combined within a range not being contradictory.

[a] First Embodiment

Figure 1:
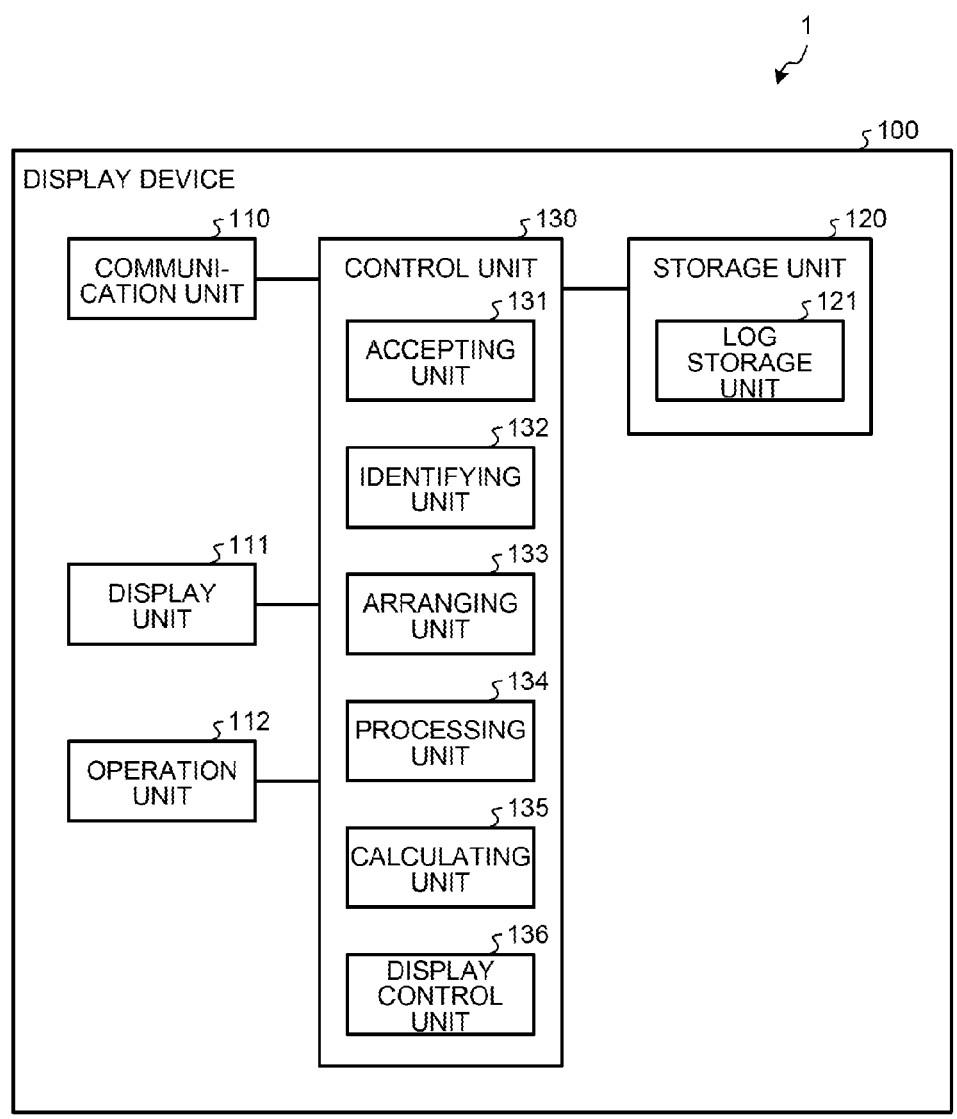
FIG. 1 is a block diagram depicting one example of a configuration of a display system of a first embodiment.

FIG. 1 is a block diagram depicting one example of a configuration of a display system of a first embodiment. A display system 1 depicted in FIG. 1 includes a display device 100. The display system 1 may include, for example, a control device of a machine tool, various kinds of test equipment such as a temperature test, and the like, and the display device 100 can acquire log data from each device. Furthermore, the display system 1 may include a terminal device for an administrator. The display device 100 and each of the devices is connected through an unillustrated network so as to enable communication with each other. Note that, in the following explanation, a case in which various kinds of information of an assembly line of a product is acquired as log data (log information) is explained as an example.

The display device 100 of the display system 1 depicted in FIG. 1 creates, for example, a graph in which log data acquired from each device is indicated, and provides the graph to an administrator of an assembly line of a product. The display device 100 acquires log information of processing in a first device that is included in the assembly line of the product, that is, a manufacturing line, and log information of processing in a second device that is included in the manufacturing line and that performs processing subsequent to the first device. The display device 100 identifies a processing period and a waiting period of the first device and a processing period and a waiting period of the second device.

The display device 100 arranges the identified processing period and waiting period of the first device on a first time axis that indicates changes of the processing period and the waiting period of the first device. Moreover, a display device 100 arranges the identified processing period and waiting period of the second device on a second time axis that is parallel to the first time axis and that indicates changes of the processing period and the waiting period of the second device. The display device 100 forms a first band that connects the processing periods for a manufactured material (product) common between the first device and the second device, and a second band that connects the waiting periods after processing of the manufactured material common between the first device and the second device.

The display device 100 calculates a distance between the first time axis and the second time axis with which an angle between the formed first band and or second band and at least either one of the first time axis and the second time axis is a predetermined angle. The display device 100 displays a graph that indicates transitions of the processing period and the waiting period with different band stripes, based on the calculated distance. That is, the display device 100 displays a graph in which a distance between time axes is adjusted so that the inclinations of bands indicating a flow of the product, that is, trace graphs, is a predetermined angle. Thus, it is possible to display variations in processing periods of each device in an easy-to-understand manner for each product that is processed in a manufacturing line.

Next, a configuration of the display device 100 is explained. As depicted in FIG. 1, the display device 100 includes a communication unit 110, a display unit 111, an operation unit 112, a storage unit 120, and a control unit 130. Note that the display device 100 may include various kinds of functional units in an existing computer, for example, a functional unit such as various kinds of input devices and sound output devices, in addition to the functional units depicted in FIG. 1.

The communication unit 110 is implemented, for example, by a network interface card (NIC), or the like. The communication unit 110 is connected to each device through an unillustrated network with a wire or wirelessly, and is a communication interface that controls communication of information among respective devices. The communication unit 110 receives log data from each device. The communication unit 110 output received log data to the control unit 130.

The display unit 111 is a display device to display various kinds of information. The display unit 111 is implemented, for example, by a liquid crystal display or the like as a display device. The display unit 111 displays various kinds of screens such as display screens including a graph input from the control unit 130, and the like.

The operation unit 112 is an input device that accepts various kinds of operations from an administrator. The operation unit 112 is implemented, for example, by a keyboard, a mouse, and the like as an input device. The operation unit 112 outputs an operation that is input by an administrator to the control unit 130 as operation information. Note that the operation unit 112 may be implemented by a touch panel or the like as an input device, and the display device of the display unit 111 and the input device of the operation unit 112 may be integrated.

The storage unit 120 is implemented, for example, by a storage device such as a random access memory (RAM), a semiconductor memory device such as a flash memory, a hard disk, and an optical disk. The storage unit 120 includes a log storage unit 121. Moreover, the storage unit 120 stores information that is used for processing by the control unit 130.

The log storage unit 121 stores log data received from each device. FIG. 2 depicts one example of the log storage unit. As depicted in FIG. 2, the log storage unit 121 has items such as a "log number", a "type", a "time", a "source", an "event identification (ID)", and an "event". The log storage unit 121 stores data handling one element of log data as one record.

The "log number" is a number that is assigned in ascending order from the latest event log, and is an identifier to identify log data. The example in FIG. 2 indicates a case in which the log numbers are arranged in descending order. The log numbers may be arranged in another order. The "type" is information indicating a type of an event log. The type of event longs are classified into three, an operation log, a manipulation log, and an error log. When the "type" is "operation", the operation log is indicated. The operation log is recorded, for example, when each device starts manufacturing of an intermediate product, and when each device finishes manufacturing of an intermediate product. When the "type" is "manipulation", the manipulation log is indicated. The manipulation log is recorded when a screen is manipulated, for example, when a display switch button in a displayed window is pressed, and the like. When the "type" is "error", the error log is indicated. The error log is recorded when some kind of error occurs in a device, for example, when a remaining amount of a material for a device to manufacture an intermediate product is equal to or less than a threshold, and the like.

The "time" is information that indicates time and date when an event or an error occurs. The "source" is information that indicates a device in which an event or an error occurs. The "event ID" is a number that is uniquely assigned for each type of an event or an error, and is an identifier to identify a type of the event or the error. The "event" is information that indicates details of an event corresponding to an event ID. The event includes, for example, start of manufacturing, end of manufacturing, display switching, requiring material restocking, operation error, and the like.

In the example in FIG. 2, for a record of the log number "1", it is indicated that the type is "operation", the time is "2012/12/10 9:00:00", the source is "device A", the event ID is "0110", and the event is "start of manufacturing". Moreover, for a record of the log number "2", it is indicated that the type is "operation", the time is "2012/12/10 9:00:05", the source is "device A", the event ID is "0111", and the event is "end of manufacturing". Furthermore, for a record of the log number "3", it is indicated that the type is "manipulation", the time is "2012/12/10 9:00:09", the source is "monitor", the event ID is "0320", and the event is "display switching".

Returning to explanation of FIG. 1, the control unit 130 is implemented, for example, by executing a program stored in an internal storage device by a central processing unit (CPU), a micro processing unit (MPU), or the like using the RAM as a work area. Moreover, the control unit 130 may be implemented, for example, by an integrated circuit, such as an application specific integrated circuit (ASIC) and a field programmable gate array (FPGA), for example. The control unit 130 includes an accepting unit 131, an identifying unit 132, an arranging unit 133, a processing unit 134, a calculating unit 135, and a display control unit 136, and achieves or performs a function and an action of information processing explained below. Note that the internal configuration of the control unit 130 is not limited to the configuration depicted in FIG. 1, and may take another configuration as long as it is a configuration to perform the information processing described later. Note that in the following explanation, a band corresponding to each product is also expressed as trace graph, and an entire graph that includes a time axis of each device or each process and a trace graph corresponding to each product is expressed simply as graph.

The accepting unit 131 accepts display of a graph when operation information indicating that a graph is to be displayed is input from the operation unit 112. Upon accepting display of a graph, the accepting unit 131 acquires log data from each device through the communication unit 110. The accepting unit 131 stores the acquired log data in the log storage unit 121. When storage of the acquired log data is completed, the accepting unit 131 outputs an identification instruction to the identifying unit 132. The accepting unit 131 may perform storage of log data from each device succeedingly in real time. In this case, upon storing data to display in a graph in the log storage unit 121, the accepting unit 131 outputs an identification instruction to the identifying unit 132.

Furthermore, when operation information indicating that any trace graph from a graph being displayed, that is, a band, is selected is input from the operation unit 112, the accepting unit 131 determines whether selection of a band is accepted. When selection of a band is accepted, the accepting unit 131 outputs information about accepted selection of a band to the calculating unit 135. When selection of a band is not accepted, the accepting unit 131 outputs information indicating that a standard time is to be used to the calculating unit 135. As a case in which the accepting unit 131 determines that selection of a band is not accepted, for example, a case in which an unillustrated standard time button that is arranged in a graph being displayed is pressed is considered. Moreover, the accepting unit 131 may determine that selection of a band is not accepted based on that a predetermined time has passed since a graph based on an unadjusted graph is displayed.

Furthermore, when operation information indicating that a scale of a time axis of a graph is to be change is input from the operation unit 112, the accepting unit 131 determines whether a change of scale of a time axis is accepted. When a change of scale of a time axis is accepted, the accepting unit 131 outputs scale change information for a time axis that indicates an accepted change of scale of a time axis to the display control unit 136. When a change of scale of a time axis is not accepted, the accepting unit 131 ends the processing. At this time, the display control unit 136 continues to output a display screen including the graph being displayed to the display unit 111 to be displayed. Note that the accepting unit 131 may be configured not to end the processing when a change of scale of a time axis is accepted, but to continue waiting for acceptance of a change of scale of a time axis. A case in which a change of scale of a time axis is not accepted includes, for example, a case in which a numeric value out of a scale changing range is input, and the like.

When an identification instruction is input from the accepting unit 131, the identifying unit 132 identifies a processing period and a waiting period of each device in a manufacturing line by referring to the log storage unit 121. That is, the identifying unit 132 identifies a processing period and a waiting period of the respective devices based on respective log data (log information) of the first device and the second device included in the manufacturing line. The identifying unit 132 outputs the identified processing period and waiting period of each device, and time and date when each device first started manufacturing in log data to the arranging unit 133.

Identification of a processing period and a waiting period is explained using FIG. 3. FIG. 3 depicts one example of identification of a processing period and a waiting period. In the example in FIG. 3, the log numbers relating to device A are "1", "2", "4", "6", "7", "12", and "13". When a processing period of device A is to be identified, the identifying unit 132 calculates, for example, a difference between the time of the log number "1" for which the event is "start of manufacturing" and the time of the log number "2" for which the event is "end of manufacturing" that appears first after that. In the example in FIG. 3, the time of the log number "1" is "2012/12/10 9:00:00" and the time of the log number "2" is "2012/12/10 9:00:05", and therefore, the difference is "00:00:05". Therefore, the first processing period of device A is "00:00:05". Note that it is expressed as "0:05" omitting an hour part in examples in FIG. 3 including other examples.

Similarly, when a waiting period of device A is to be identified, the identifying unit 132 calculates, for example, a difference between the time of the log number "2" for which the event is "end of manufacturing" and the time of the log number "6" for which the event is "start of manufacturing" that appears first after that. In the example in FIG. 3, the time of the log number "2" is "2012/12/10 9:00:05" and the time of the log number "6" is "2012/12/10 9:00:20", and therefore, the difference is "00:00:15". Therefore, the first waiting period of device A is "00:00:15". The identifying unit 132 identifies a processing period and a waiting period similarly for all of the devices included in the log data. In the example in FIG. 3, the identifying unit 132 identifies a processing period and a waiting period of device A and device B.

When processing is performed by device C subsequent to device B in a manufacturing line, the identifying unit 132 identifies a processing period and a waiting period of device C, similarly to device A and device B. In other words, the identifying unit 132 further identifies a processing period and a waiting period of a third device based on log information of processing in the third device that performs processing subsequent to the second device and that is included in a manufacturing line.

Returning back to explanation of FIG. 1, the arranging unit 133 arranges, when a processing period and a waiting period of each device, and time when manufacturing is first started by each device in log data are input from the identifying unit 132, the processing period and the waiting period on a time axis corresponding to each device in a graph. The arranging unit 133 arranges, for example, a processing period and a waiting period of respective devices on time axes corresponding to device A, device B, and device C. In other words, the arranging unit 133 arranges identified processing period and waiting period of the first device on the first time axis that indicates changes of a processing period and a waiting period of the first device. Moreover, the arranging unit 133 arranges identified processing period and waiting period of the second device on the second time axis that is parallel to the first time axis and that indicates changes of the processing period and the waiting period of the second device. Furthermore, the arranging unit 133 arranges identified processing period and waiting period of the third device on a third time axis that is parallel to the second time axis and that indicates changes of the processing period and the waiting period of the third device. At this time, the arranging unit 133 sets an initial position on a time axis of a processing period, based on time when manufacturing is first started by each device in log data.

Moreover, the arranging unit 133 forms the first band that connects processing periods on the time axes of respective devices per product, and the second band that connects waiting periods after the processing of the product. In other words, the arranging unit 133 forms the first band that connects processing periods for a manufactured material (product) common between the first device and the second device, and the second band that connects waiting periods after the processing of the manufactured material (product) common between the first device and the second device. Furthermore, the arranging unit 133 may connect a processing period of the third device to the first band, and connect a waiting period to the second band. In this case, the first band connects processing periods for the manufacturing material (product) common among the first device, the second device, and the third device. Moreover, the second band connects waiting periods for the manufacturing material (product) common among the first device, the second device, and the third device. Note that the second band is a region that is sandwiched between the first bands when more than one first band is formed.

That is, the arranging unit 133 arranges a processing period and a waiting period of each device on a time axis corresponding to each device, and creates an unadjusted graph in which the first band that corresponds to a processing period of each product processed in a manufacturing line and the second band that corresponds to a waiting period between respective products are arranged. In other words, the arranging unit 133 creates an unadjusted graph in which trace graphs of respective products that are processed in a manufacturing line. The arranging unit 133 outputs the created unadjusted graph to the processing unit 134 and the display control unit 136.

Figure 4:
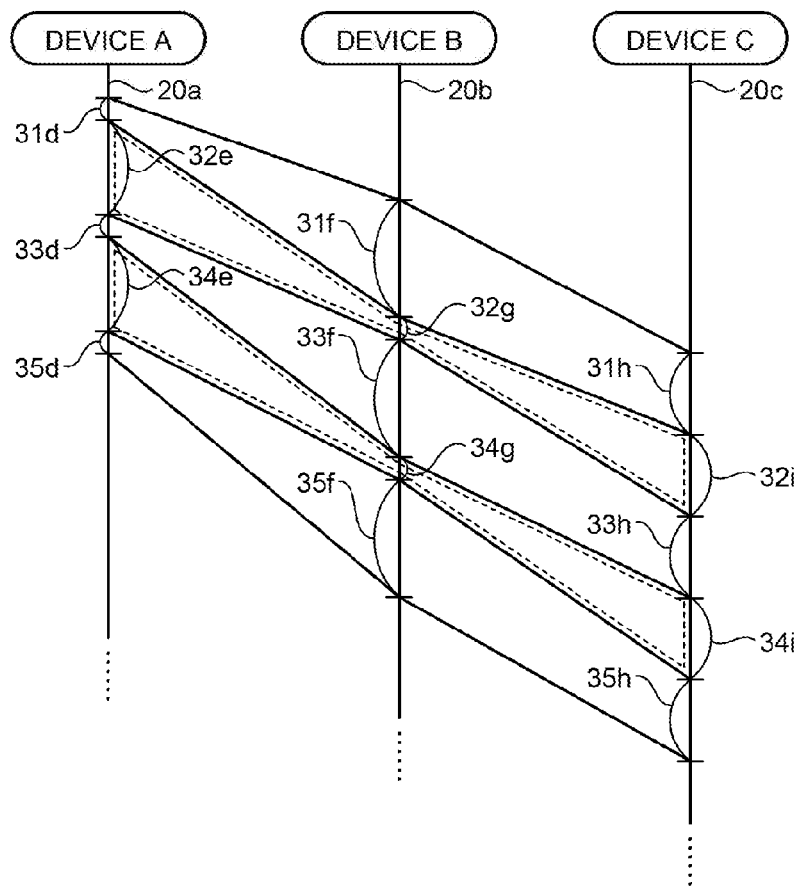
FIG. 4 depicts one example of arrangement of the processing period, the waiting period, and a band.

Arrangement of a processing period, a waiting period, and a band is explained herein using FIG. 4. FIG. 4 depicts one example of arrangement of a processing period, a waiting period, and a band. In the example in FIG. 4, the arranging unit 133 arranges a time axis 20a corresponding to device A, a time axis 20b corresponding to device B, and a time axis 20c corresponding to device C in a graph. Subsequently, the arranging unit 133 arranges a first processing period of each device on a corresponding time axis based on the time when each device first starts manufacturing in log data. In the example in FIG. 3 and FIG. 4, the arranging unit 133 arranges a processing period 31d corresponding to the first processing period "00:00:05" of device A on the time axis 20a such that "2012/12/10 9:00:00", which is the time when device A first starts manufacturing in the log data, is the starting point.

Furthermore, the arranging unit 133 arranges a waiting period 32e corresponding to the first waiting period "00:00:15" of device A on the time axis 20a at a later position in the flow of time relative to the processing period 31d. The arranging unit 133 arranges a processing period 33d corresponding to the second processing period "00:00:05" of device A on the time axis 20a at a later position in the flow of time relative to the waiting period 32e. The arranging unit 133 arranges a waiting period 34e corresponding to the second waiting period "00:00:15" of device A on the time axis 20a at a later position in the flow of time relative to the processing period 33d. The arranging unit 133 arranges a processing period 35d corresponding to the third processing period "00:00:05" of device A on the time axis 20a at a later position in the flow of time relative to the waiting period 34e.

The arranging unit 133 arranges a processing period 31f, a waiting period 32g, a processing period 33f, a waiting period 34g, and a processing period 35f similarly on a time axis 20b of device B in this order. Moreover, the arranging unit 133 arranges a processing period 31h, a waiting period 32i, a processing period 33h, a waiting period 34i, and a processing period 35h similarly on a time axis 20c of device C in this order.

Subsequently, the arranging unit 133 forms the first band connecting the processing period 31d, the processing period 31f, and the processing period 31h corresponding to one product, that is, a manufacturing material, and arranges in the graph. Furthermore, the arranging unit 133 forms the second band connecting the waiting period 32e, the waiting period 32g, and the waiting period 32i between a processing period of one product and a processing period of another product, and arranges in the graph.

Although it is not described clearly in the log data (log information) of each device exemplified in FIG. 3, an identifier that is assigned uniquely to a product that is the subject of start of manufacturing and end of manufacturing, such as a product number, may be stored being associated thereto. When a product number is stored being associated thereto, a band connecting processing periods related to an identical product number may be formed. Moreover, when an identifier such as a product number is not included in log data, a band connecting processing periods at the same order counting from a start of manufacturing in respective devices, such as products for which a start of manufacturing and an end of manufacturing occur first in respective devices, products for which a start of manufacturing and an end of manufacturing occur second in respective devices. In this case, each device in the manufacturing line performs manufacturing processing in a first-in first-out (FIFO) manner, and it is assumed that an in-process product is not held as it is in the manufacturing line. That is, a product for which the manufacturing processing has been started in the manufacturing line is processed sequentially by device A, device B, and device C, and it is assumed that the manufacturing line never goes into a non-operating period in a state in which the processing is stopped between device A and device B, or between device B and device C, and never starts processing from a device halfway in the line, such as device B and device C.

For other processing periods and waiting periods also, the arranging unit 133 forms the first band connecting the processing period 33*d*, the processing period 33*f*, and the processing period 33*h* similarly, and arranges in the graph. Furthermore, the arranging unit 133 forms the second band connecting the waiting period 34*e*, the waiting period 34*g*, and the waiting period 34*i*, and arranges in the graph. Moreover, the arranging unit 133 forms the first band connecting the processing period 35*d*, the processing period 35*f*, and the processing period 35*h*, and arranges in the graph. Note that in the second bands in FIG. 4, doted lines are drawn thereinside to distinguish from the first bands.

Returning back to FIG. 1, when the unadjusted graph is input from the arranging unit 133, the processing unit 134 refers to the log storage unit 121, and calculates an average or a minimum time of processing periods of each device, and an average or a minimum time of waiting periods from an end until a start of processing among devices. In other words, the processing unit 134 calculates an average or a minimum time of processing periods in each of the first device and the second device, and an average or a minimum time of waiting periods from when processing in the first device is ended until processing in the second device is started, based on the log information. Moreover, the processing unit 134 calculates an average or a minimum time of processing periods in the third device, and an average or a minimum time of waiting periods from when processing in the second device is ended until processing in the third device is started. The waiting periods is time in which a traveling time of a product between devices and a time waited until processing is started at a device of a traveling destination after the travel are added, based on product processed in the manufacturing line.

The average and the minimum time of processing periods in each device and the average and the minimum time of waiting periods from an end until a start of processing in respective devices are standard times of the manufacturing line. That is, the processing unit 134 calculates a standard time in the manufacturing line. As for the standard time, there is a case of adopting an average, or of adopting a minimum time, for example, according to a field of company and product. The processing unit 134 outputs the calculated standard time to the calculating unit 135.

To the calculating unit 135, information indicating that the standard time is used is input from the accepting unit 131, and the standard time is input from the processing unit 134. When the information and the standard time are input, the calculating unit 135 calculates a distance between time axes corresponding to respective devices so that an inclination of a trace graph corresponding to the standard time is a predetermined angle, for example 45 degrees in the direction of time flow relative to a line connecting the same time on the time axes. In other words, the calculating unit 135 calculates a distance between time axes based on a time difference between start times or end times of processing of the first device and the second device that is identified from the average of processing periods and the average of waiting periods, or the minimum time of processing periods and the minimum time of waiting periods. Moreover, the calculating unit 135 calculates a distance between the first time axis and the second time axis, and a distance between the second time axis and the third time axis so that an angle of the formed first band or second band is a predetermined angle relative to at least either one of the first time axis, the second time axis, and the third time axis. Thus, the calculating unit 135 can adjust a distance between respective time axes independently. The calculating unit 135 outputs the calculated distance between the time axes corresponding to the respective devices to a display control unit 136. An inclination of a trace graph may be relative to an upper edge or a lower edge of the trace graph. Trace graphs of the product lies flat if a scale of time axes is large, to appear as if the process is going well because differences in angle is difficult to be discriminated. Moreover, trace graphs becomes vertically long if a scale of time axes is small, and differences in angle are difficult to be distinguished, and a scrolling range increases to take long time to find a desired part. Therefore, the calculating unit 135 calculates a distance between time axes to adjust the distance between the time axes.

The calculating unit 135 calculates a time difference between start times of device A and device B by adding the average of processing periods of device A and the average of waiting times of device B. The calculating unit 135 calculates, when the calculated time difference is 10 seconds and is expressed on the time axis of the graph in 10 millimeters (mm), the distance between the time axes of device A and device B as 10 mm so that the inclination of the trace graph of the standard time is to be 45 degrees. That is, a distance equal to a distance on the display corresponding to the time difference on the time axis is the distance between the time axes on the display. When the inclination of the trace graph is to be an angle other than 45 degrees, the calculating unit 135 can calculate the inclination of the trace graph relative to a line connecting the same times on the respective time axes as below, where the angle in a direction of time flow is $\theta$. A distance between respective time axes of the respective devices can be calculated by an equation of a distance between time axes=a distance corresponding to a time difference/tan $\theta$. Moreover, the calculating unit 135 can use a distance between time axes=a distance corresponding to a time difference×tan $\delta$ when the inclination of the trace graph is an angle relative to a time axis.

Figure 5:
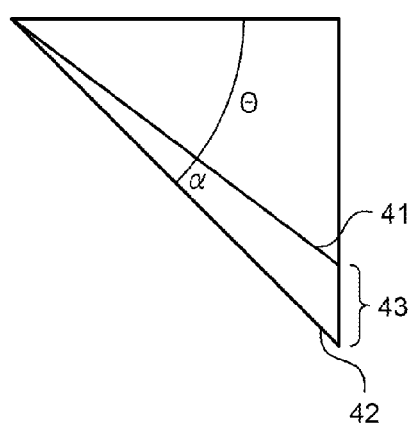
FIG. 5 depicts one example of an angle of a trace graph and a time lag.

An angle of a trace graph and a time lag are explained using FIG. 5. FIG. 5 depicts one example of an angle of a trace graph and a time lag. A trace graph of a manufacturing line is sometimes used to determine whether a product processed in the manufacturing line is delayed compared to the standard time. As depicted in FIG. 5, for example, when there is a time lag 43 between a graph 41 of the standard time and a graph 42 of one product, if an angle $\alpha$ corresponding to the time lag is maximized, it is easy for an administrator viewing the trace graph to find the delay. The inclination of the graph 41 with which the angle $\alpha$ is maximized, that is, the angle $\theta$ formed by the graph 41 relative to a line connecting the same times on time axes, is $\pi/4$, namely, 45 degrees. In other words, the angle of the graph 41 relative to a time axis ($\delta=\pi/2-\theta$) is $\pi/4$, namely, 45 degrees.

Moreover, the calculating unit 135 calculates, when band selection information is input from the accepting unit 131, a distance between the time axes corresponding to the respective devices with reference to the selected band, that is, the trace graph. The calculating unit 135 calculates a distance between the time axes corresponding to the respective devices so that the inclination of a line connecting start times of processing periods of respective devices for a product that corresponds to the selected band, that is, the upper edge of the trace graph of the selected product, is 45 degrees. Calculation of a distance between time axes is the same as the case of making the inclination of the trace graph of the standard time 45 degrees, and therefore, explanation thereof is omitted. The calculating unit 135 outputs the calculated distance between the time axes of the respective devices to the display control unit 136.

Returning back to explanation of FIG. 1, when the unadjusted graph is input from the arranging unit 133, the display control unit 136 creates a graph expressing transitions of a processing period and a waiting period by different striped bands based on the unadjusted graph. The display control unit 136 creates a graph in which a band corresponding to a processing period and a band corresponding to a waiting period are in different colors. That is, the display control unit 136 creates, for example, a graph in which a trace graph corresponding to a processing period of each product processed in the manufacturing line is colored, and a band corresponding to a waiting period is not colored. In the following explanation, a trace graph corresponding to a processing period of each product is also expressed as a trace graph corresponding to each product, simply. The display control unit 136 creates a display screen including the created graph, and outputs the created display screen to the display unit 111 to be displayed.

The display control unit 136 creates, when the distance between the time axes corresponding to the respective devices is input from the calculating unit 135, a graph that is obtained by adjusting the unadjusted graph input from the arranging unit 133 based on the distance between the time axes corresponding to the respective devices. The display control unit 136 creates a display screen including the generated graph, and outputs the created display screen to the display unit 111 to be displayed. Furthermore, the display control unit 136 changes, when the scale change information for a time axis is input from the accepting unit 131, a scale of the time axis of the graph being displayed, according to the input scale change information for a time axis.

Figure 6:
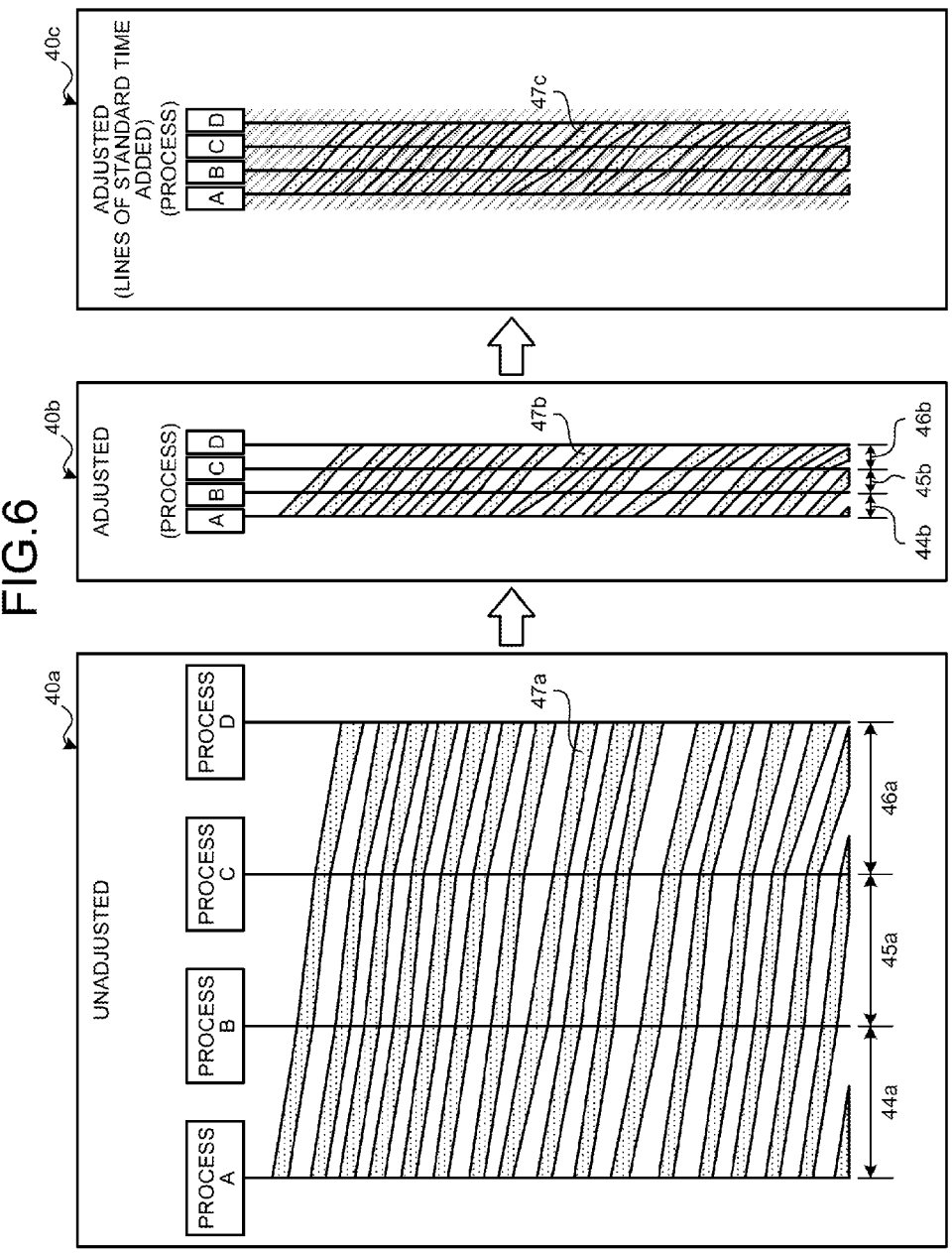
FIG. 6 depicts one example of graphs before and after adjustment when the inclination of a trace graph corresponding to a standard time is 45 degrees.

A graph when the inclination of a trace graph corresponding to the standard time is 45 degrees is explained using FIG. 6. FIG. 6 depicts one example of graphs before and after adjustment when the inclination of the trace graph corresponding to the standard time is 45 degrees. In the example in FIG. 6, time axes are expressed with labels indicating respective processes corresponding to respective devices. Moreover, in the example in FIG. 6, a case in which a manufacturing line has four processes of process A to process D is explained. In an unadjusted graph 40a, for example, a distance 44a between a time axis of process A and a time axis of process B, a distance 45a between the time axis of process B and a time axis of process C, and a distance 46a between the time axis of process C and a time axis of process D are the same. At this time, manufacturing of a product corresponding to a trace graph 47a is delayed compared to the standard time; however, an administrator can overlook a difference in inclination of the trace graph 47a, that is, the delay. Although each of unadjusted graphs from FIG. 6 to FIG. 9 is a graph in which a trace graph is colored based on an unadjusted graph, it is expressed as unadjusted graph for explanation's sake.

On the other hand, an adjusted graph 40b is a graph that is obtained by adjusting the unadjusted graph 40a so that the inclination of the trace graph corresponding to the standard time is 45 degrees, based on calculated distances between time axes corresponding to the respective devices. In the adjusted graph 40b, a distance 44b between the time axis of process A and the time axis of process B is shorter than the distance 44a before adjustment, so that the inclination of the trace graph corresponding to the standard time is 45 degrees. Similarly, in the adjusted graph 40b, a distance 45b between the time axis of process B and the time axis of process C is shorter than the distance 45a before adjustment, and a distance 46b between the time axis of process C and the time axis of process D is shorter than the distance 46a before adjustment.

Although the distances between the time axes of the respective processes are the same in the unadjusted graph, distances between time axes of respective processes are not necessarily the same distance in an adjusted graph as a result of matching the inclination of a trace graph between adjacent time axes to a predetermined angle. For example, in an adjusted graph, the inclination of a trace graph can differ in each of between process A and process B, and between process B and process C. When an adjusted graph is created, the distance between the time axis of process A and the time axis of process B is calculated so that an angle of the trace graph between process A and process B is a predetermined angle, and the distance between the time axis of process B and the time axis of process C is calculated so that an angle of the trace graph between process B and process C is a predetermined angle. The distance between the time axis of process A and the time axis of process B, and the distance between the time axis of process B and the time axis of process C thus calculated naturally differ from each other if the inclination of the trace graph between process A and process B and the inclination of the trace graph between process B and process C differ from each other.

In the adjusted graph 40b, for example, the upper edge of the trace graph of a product processed in the manufacturing line along the standard time is 45 degrees. Moreover, in the adjusted graph 40b, a trace graph 47b of a product being delayed in manufacturing from the standard time is expressed such that a lag from the standard time is emphasized, and therefore, it is easy to find the delay in manufacturing compared to the unadjusted graph 40a.

Furthermore, the display control unit 136 may display, on a rearmost layer behind the graph, lines inclined by 45 degrees that indicate the inclination of the trace graph of the standard time. In an adjusted graph 40c depicted in FIG. 6 is a graph in which lines inclined by 45 degrees are displayed on a rearmost layer behind the adjusted graph 40b. In the adjusted graph 40c, a trace graph 47c of a product being delayed in manufacturing from the standard time can be easily compared with the lines inclined by 45 degrees on the rearmost layer, it is further easier to find the delay in manufacturing compared to the adjusted graph 40b.

Figure 7:
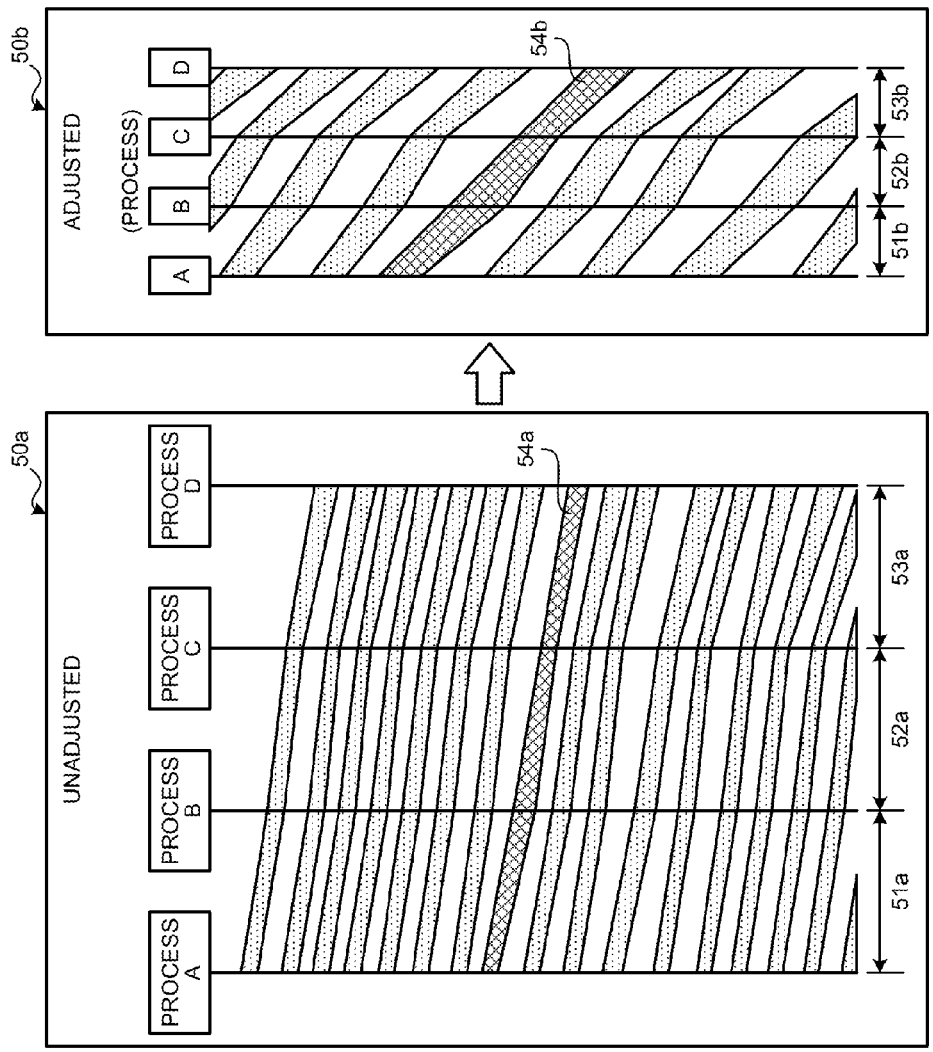
FIG. 7 depicts one example of graphs before and after adjustment when the inclination of a trace graph corresponding to a selected product is 45 degrees.

Next, a graph in a case in which the inclination of a trace graph corresponding to a selected product is set as 45 degrees is explained using FIG. 7. FIG. 7 depicts one example of graphs before and after adjustment when the inclination of a trace graph corresponding to a selected product is 45 degrees. In the example in FIG. 7, time axes are expressed with labels indicating respective processes corresponding to respective devices, similarly to FIG. 6, and a case in which a manufacturing line has four processes of process A to process D is explained. In an unadjusted graph 50a, for example, a distance 51a between a time axis of process A and a time axis of process B, a distance 52a between the time axis of process B and a time axis of process C, and a distance 53a between the time axis of process C and a time axis of process D are the same. Moreover, a trace graph 54a corresponding to a selected product is displayed, for example, in a different color from other trace graphs to indicate that it is being selected.

On the other hand, an adjusted graph 50b is a graph that is obtained by adjusting the unadjusted graph 50a so that the inclination of the trace graph 54a corresponding to the selected product is 45 degrees, based on calculated distances between time axes corresponding to the respective devices. In the adjusted graph 50b, the trace graph 54a of the unadjusted graph 50a corresponds to a trace graph 54b. In the adjusted graph 50b, each distance between time axes corresponding to adjacent processes is set such that an angle of a line segment arranged between the adjacent processes is a predetermined angle relative to the time axes sandwiching the line segment, within a selected band. In the example in FIG. 7, the distance 51a is changed to a distance 51b so that the inclination of a line segment between process A and process B in the trace graph 54a is 45 degrees relative to the time axis corresponding to process A and the time axis corresponding to process B. Furthermore, the distance 52a is changed to a distance 52b so that the inclination of a line segment between process B and process C in the trace graph 54a is 45 degrees relative to the time axis corresponding to process B and the time axis corresponding to process C. Moreover, the distance 53a is changed to a distance 53b so that the inclination of a line segment between process C and process D in the trace graph 54a is 45 degrees relative to the time axis corresponding to process C and the time axis corresponding to process D.

As a result of thus calculating the distances between the time axes, in the example in FIG. 7, the distance 51b between the time axis of process A and the time axis of process B is shorter than the distance 51a before adjustment. Similarly, in the graph 50b, the distance 52b between the time axis of process B and the time axis of process C is shorter than the distance 52a before adjustment, and the distanced 53b between the time axis of process C and the time axis of process D is shorter than the distance 53a before adjustment. By thus adjusting the inclination of a trace graph corresponding to a selected product to be a predetermined angle, it can facilitate comparison of the selected product with other products based on a period of time from one process to another process.

Figure 8:
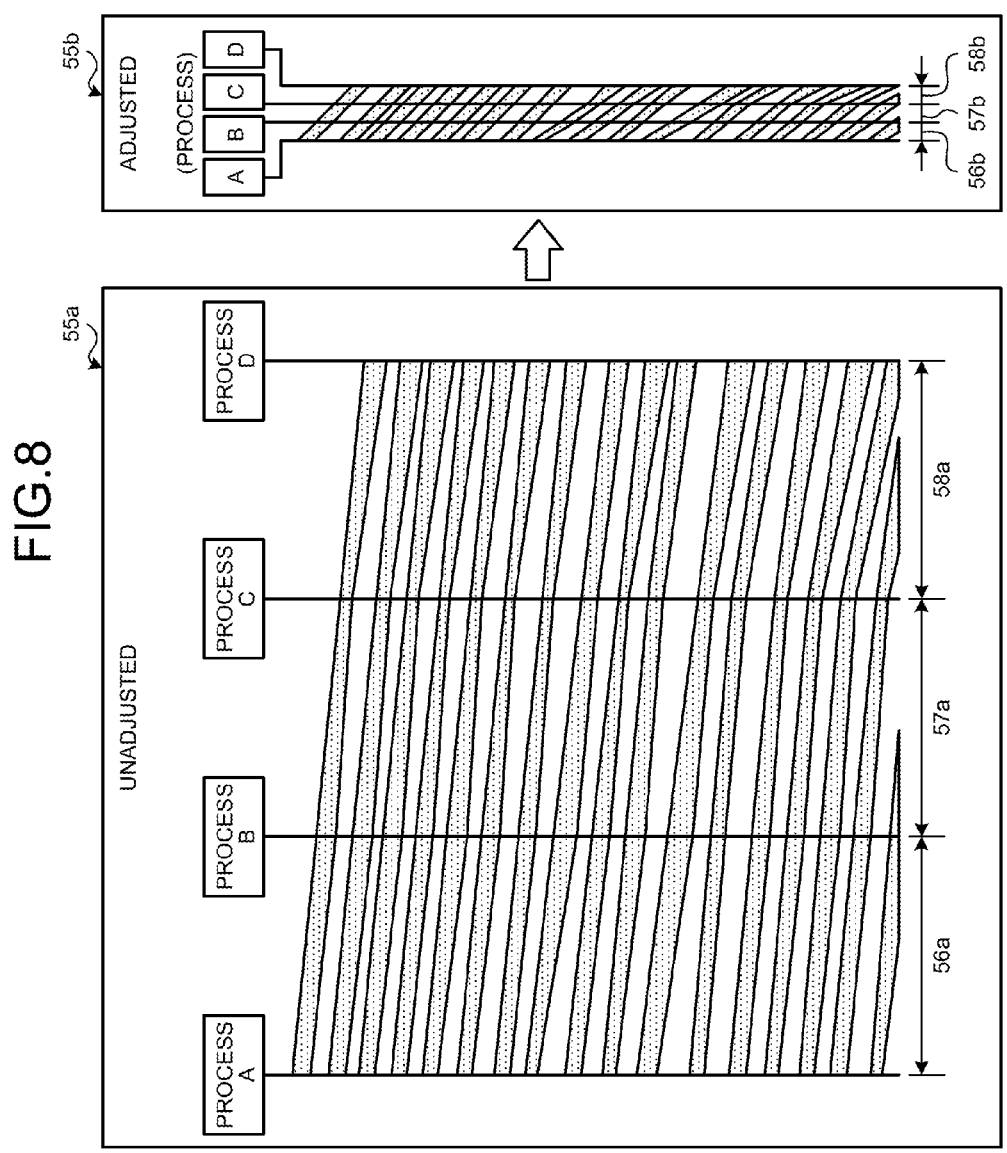
FIG. 8 depicts another example of graphs before and after adjustment when the inclination of a trace graph corresponding to a standard time is 45 degrees.
Figure 9:
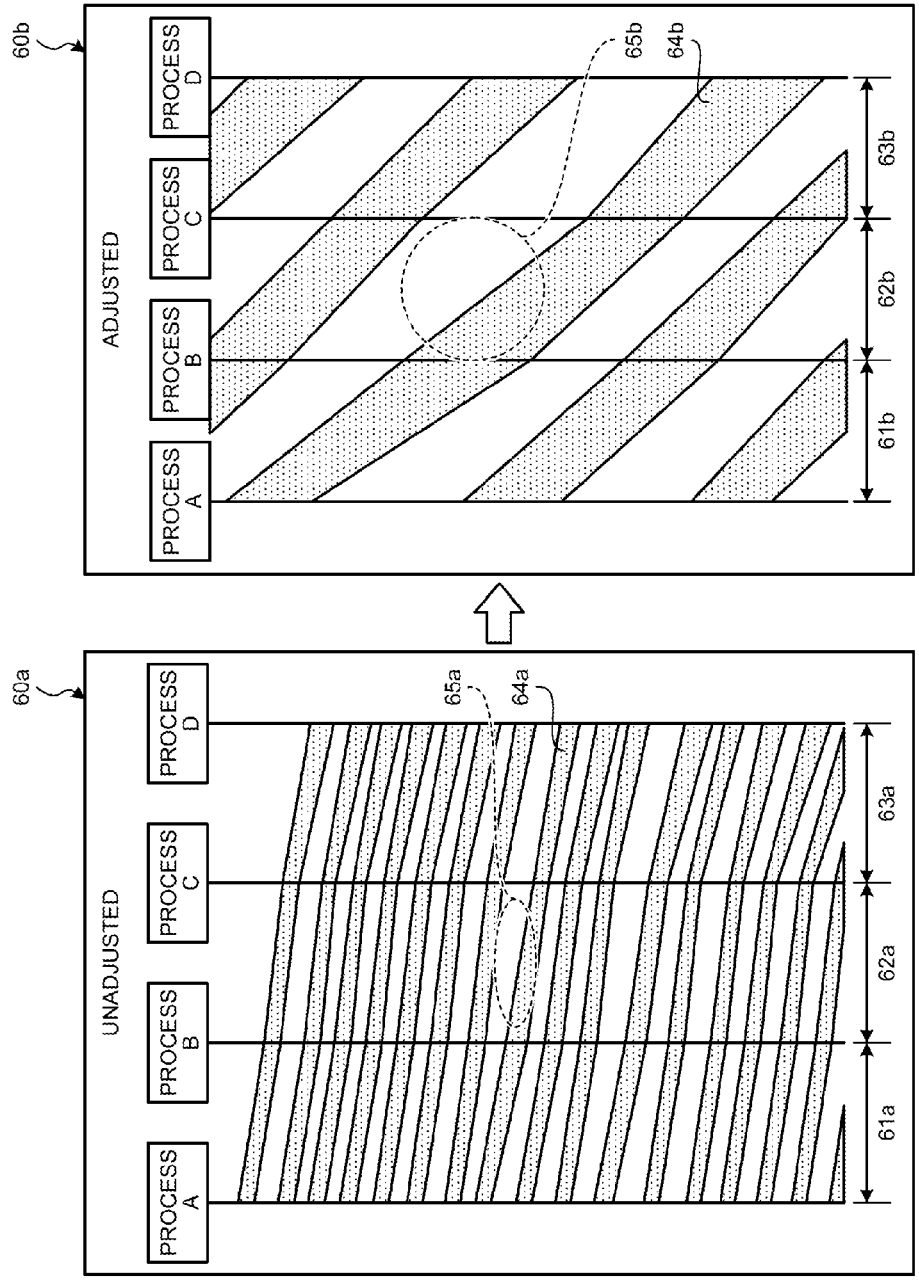
FIG. 9 depicts one example of a graph in which a distance between time axes is enlarged or reduced according to a change of scale of a time axes.

Next, a case in which a scale of a time axis is changed when the inclination of a trace graph corresponding to the standard time is 45 degrees using FIG. 8 and FIG. 9. FIG. 8 depicts another example of graphs before and after adjustment when the inclination of a trace graph corresponding to the standard time is 45 degrees. In the example in FIG. 8, time axes are expressed with labels indicating respective processes corresponding to respective devices, similarly to FIG. 6, and a case in which a manufacturing line has four processes of process A to process D is explained. In an unadjusted graph 55a, for example, a distance 56a between a time axis of process A and a time axis of process B, a distance 57a between the time axis of process B and a time axis of process C, and a distance 58a between the time axis of process C and a time axis of process D are the same.

On the other hand, an adjusted graph 55b is a graph that is obtained by adjusting the unadjusted graph 55a so that the inclination of a trace graph corresponding to the standard time is 45 degrees, based on calculated distances between the time axes corresponding to the respective devices. In the adjusted graph 55b, a distance 56b between the time axis of process A and the time axis of process B is shorter than the distance 56a before adjustment, so that the inclination of the trace graph corresponding to the standard time is 45 degrees. Similarly, in the adjusted graph 55b, a distance 57b between the time axis of process B and the time axis of process C is shorter than the distance 57a before adjustment, and a distance 58b between the time axis of process C and the time axis of process D is shorter than the distance 58a before adjustment. In the adjusted graph 55b, for example, the upper edge of the trace graph of a product processed in the manufacturing line along the standard time is 45 degrees.

The unadjusted graph 55a is in a state in which trace graphs lie flat, that is, a state in which an angle thereof relative to a time axis is nearly 90 degrees, for example, because the processing period in each process is short, or the like. Therefore, if distances between the respective time axes are adjusted without hanging the scale of the time axes, the width of the graph becomes too narrow to read the graph as the adjusted graph 55b. The display control unit 136 changes, when scale change information for a time axis is input from the accepting unit 131, a scale of the time axis of the graph being displayed, according to the scale change information for the time axis.

FIG. 9 depicts one example of a graph in which a distance between time axes is enlarged or reduced according to a change of scale of a time axes. In the example in FIG. 9, the time axes are expressed with labels indicating respective processes corresponding to respective devices, similarly to FIG. 8, and a case in which a manufacturing line has four processes of process A to process D is explained. In an unadjusted graph 60a, for example, a distance 61a between a time axis of process A and a time axis of process B, a distance 62a between the time axis of process B and a time axis of process C, and a distance 63a between the time axis of process C and a time axis of process D are the same.

On the other hand, an adjusted graph 60b is a graph that is obtained by adjusting the unadjusted graph 60a so that the inclination of a trace graph corresponding to the standard time is 45 degrees, based on calculated distances between the time axes corresponding to the respective devices, and further, in which the scale of the time axes is enlarged. In the adjusted graph 50b, for example, the scale of the time axes is enlarged in such a manner that a width of the graph after distances of the respective time axes are adjusted is equal to a width of the unadjusted graph 60a. That is, a distance 61b+62b+63b and a distance 61a+62a+63a in the unadjusted graph 60a are the same distance.

In the unadjusted graph 60a, for example, it is difficult to distinguish a difference in inclination of a trace graph 64a in a region 65a between process B and process C from inclinations of other trace graphs. On the other hand, in the enlarged adjusted graph 60b, it is easy to distinguish a difference in inclination of a trace graph 64b in a region 65b corresponding to the region 65a of the trace graph 64a from inclinations of other trace graphs. Moreover, in the adjusted graph 60b, distances between the respective time axes are increased or reduced according to a change of scale of a time axes corresponding to the respective processes while maintaining the angle of a trace graph, and therefore, it is possible to improve visibility of the trace graph compared to the adjusted graph 55b in FIG. 8.

Figure 10:
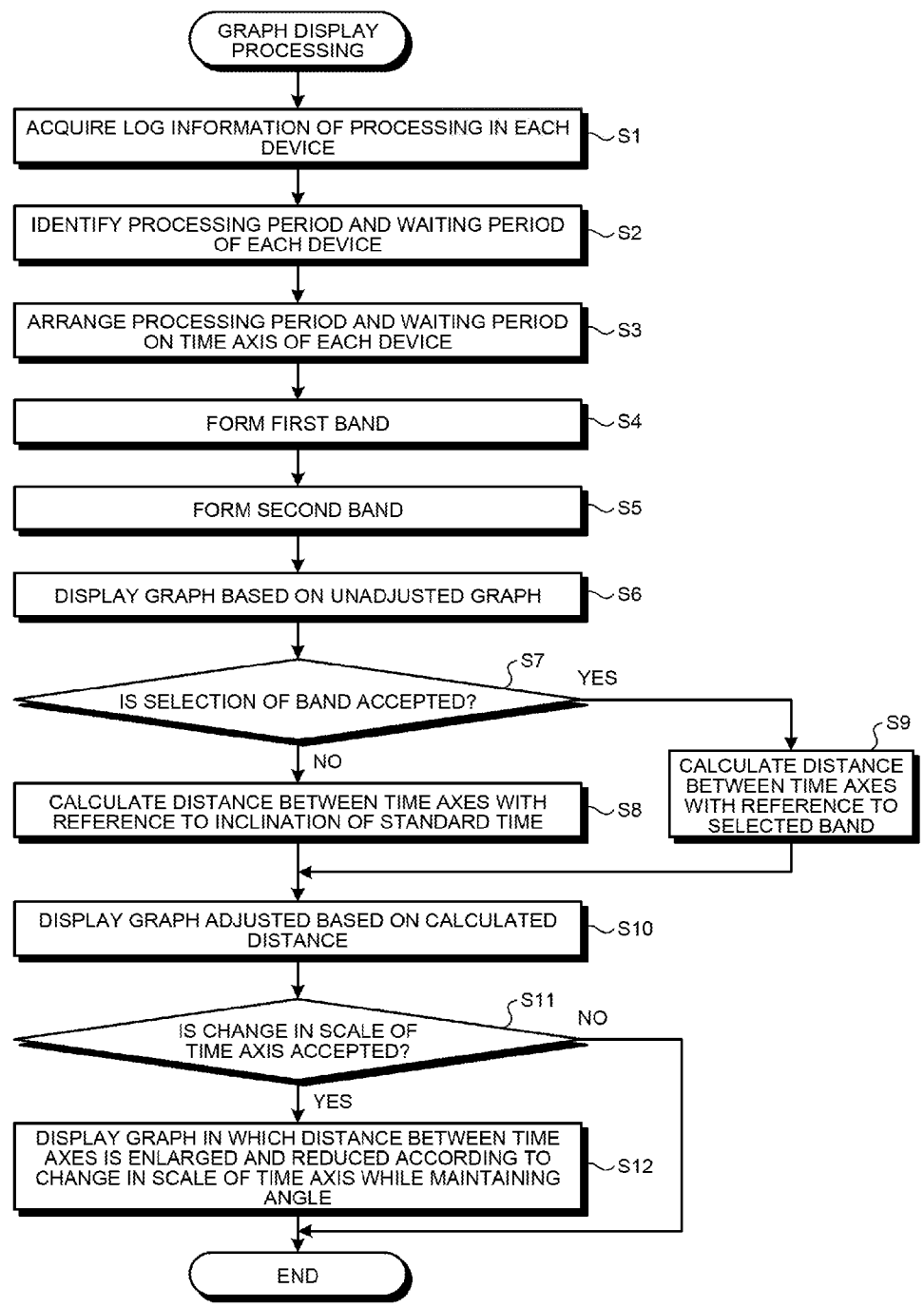
FIG. 10 is a flowchart indicating one example of a graph display processing of the first embodiment.

Next, operation of the display device 100 of the first embodiment is explained. FIG. 10 is a flowchart indicating one example of a graph display processing of the first embodiment.

The accepting unit 131 of the display device 100 accepts, when operation information indicating that a graph is to be displayed is input from the operation unit 112, display of a graph. Upon accepting display of a graph, the accepting unit 131 acquires log data, that is, log information, from each device through the communication unit 110 (step S1). The accepting unit 131 stores the acquired log data in the log storage unit 121. When storage of the acquired log data is completed, the accepting unit 131 outputs an identification instruction to the identifying unit 132.

When the identification instruction is input from the accepting unit 131, the identifying unit 132 refers to the log storage unit 121, and identifies a processing period and a waiting period in each device in a manufacturing line (step S2). The identifying unit 132 outputs the identified processing period and waiting period of each device and a time when each device first started manufacturing in the log data, to the arranging unit 133.

When the processing period and the waiting period of each device, and the time when each device first started manufacturing in the log data are input from the identifying unit 132, the arranging unit 133 arranges the processing period and the waiting period on a time axis corresponding to each device in a graph (step S3). Moreover, the arranging unit 133 forms the first band connecting processing periods on time axes of respective devices per product (step S4). Furthermore, the arranging unit 133 forms the second band connecting waiting periods after a product is processed (step S5). That is, the arranging unit 133 creates an unadjusted graph in which trace graphs of respective products that are processed in the manufacturing line are arranged. The arranging unit 133 outputs the created unadjusted graph to the processing unit 134 and the display control unit 136.

When the unadjusted graph is input from the arranging unit 133, the display control unit 136 creates a graph that indicates transitions of the processing period and the waiting period with different band stripes. The display control unit 136 creates a display screen including the created graph, and outputs the created display screen to the display unit 111 to be displayed (step S6). Moreover, when the unadjusted graph is input from the arranging unit 133, the processing unit 134 refers to the log storage unit 121, and calculates an average or a minimum time of processing periods of each device, and an average or a minimum time of waiting periods from an end until a start of processing among devices. That is, the processing unit 134 calculates a standard time of the manufacturing line. The processing unit 134 outputs the calculated standard time to the calculating unit 135.

The accepting unit 131 determines, when operation information indicating that either band is selected is input from the operation unit 112, whether selection of a band is accepted (step S7). When selection of a band is not accepted (step S7: NO), the accepting unit 131 outputs information indicating that the standard time is used, to the calculating unit 135.

To the calculating unit 135, the information indicating that the standard time is used from the accepting unit 131, and the standard time is input from the processing unit 134. When the information and the standard time are input, the calculating unit 135 calculates a distance between time axes corresponding to respective devices based on a trace graph corresponding to the standard time, that is, so that an inclination the trace graph corresponding to the standard time between adjacent processes is a predetermined angle (step S8). In other words, a distance between time axes corresponding to adjacent processes is calculated so that an angle of a line segment corresponding to a region between the adjacent processes in a trace graph corresponding to the standard time is a predetermined angle relative to the time axes sandwiching the line segment. The calculating unit 135 outputs the calculated distance between time axes corresponding to respective devices to the display control unit 136.

When selection of a band is accepted (step S7: YES), the accepting unit 131 outputs accepted band selection information to the calculating unit 135. When the band selection information is input, the calculating unit 135 calculates a distance between time axes corresponding to respective devices based on a selected band (step S9). That is, in the selected band, a distance between time axes corresponding to adjacent processes is calculated so that an angle of a line segment arranged between the adjacent processes is a predetermined angle relative to the time axes sandwiching the line segment. The calculating unit 135 outputs the calculated distance between the time axes corresponding to the respective devices to the display control unit 136.

When the distance between the time axes corresponding to the respective devices are input from the calculating unit 135, the display control unit 136 creates a graph that is obtained by adjusting the unadjusted graph input from the arranging unit 133 based on the distances between the time axes corresponding to the respective devices. The display control unit 136 creates a display screen including the created graph, and outputs the created display screen to the display unit 111 to be displayed (step S10).

The accepting unit 131 determines whether operation information indicating that a scale of a time axis of the graph is to be changed is input from the operation unit 112, and whether a change of scale of a time axis is accepted (step S11). When a change of scale of a time axis is accepted (step S11: YES), the accepting unit 131 outputs scale change information for a time axis that indicates an accepted change of scale of a time axis to the display control unit 136. The display control unit 136 changes, when the scale change information for a time axis is input from the accepting unit 131, a scale of the time axis of the graph being displayed, according to the input scale change information for a time axis. The display control unit 136 creates a display screen including a graph in which a distance between the time axes is enlarged or reduced according to the change of scale of a time axis while maintaining the angle of the trace graph, and outputs the created display screen to the display unit 111 to be displayed (step S12).

When a change of scale of a time axis is not accepted (step S11: NO), the accepting unit 131 ends the processing. That is, the display control unit 136 continues to output a display screen including the graph being displayed to the display unit 111 to be displayed. Thus, when displaying a trace graph of a manufacturing line, the display device 100 can display the trace graph in such a manner that variations in processing periods are easy to be recognized. Furthermore, the display device 100 enables visual recognition of time relations of a product that is processed in a line with a plurality of manufacturing devices in being processed sequentially by the manufacturing devices. Moreover, in the manufacturing line, when a problem occurs in either one of the manufacturing devices or in a conveyance process between the devices, processing takes long time compared to a case without a problem. The display device 100 can create a graph that facilitates recognition of a part taking long processing time. Thus, the display device 100 can support responding to a problem occurring in the manufacturing line, or planning a measure to improve work efficiency and safety.

As described, the display device 100 identifies a processing period and a waiting period of the first device and a processing period and a waiting period of the second device based on log information of processing in the first device that is included in the manufacturing line, and on log information of processing in the second device that performs processing subsequent to the first device, and that is included in the manufacturing line. Moreover, the display device 100 arranges the identified processing period and waiting period of the first device on the first time axis expressing changes of the processing period and the waiting period of the first device. Furthermore, the display device 100 arranges the identified processing period and waiting period of the second device on the second time axis expressing changes of the processing period and the waiting period of the second device. Moreover, the display device 100 forms the first band connecting processing periods for a product common between the first device and the second device, and the second band connecting waiting periods after the processing of the product common between the first device and the second device. Furthermore, the display device 100 calculates a distance between the first time axis and the second time axis so that an angle of the formed first band or second band is a predetermined angle relative to the first time axis or the second time axis or a combination thereof. Moreover, the display device 100 displays a graph in which transitions of the processing period and the waiting period are expressed with different band stripes based on the calculated distance. As a result, it is possible to display variations in processing periods in an easy-to-understand manner.

Furthermore, the display device 100 accepts selection of either band from the displayed graph. Moreover, the display device 100 calculates a distance with reference to the accepted band when calculating the distance. As a result, it is possible to display variations in processing periods of other bands in an easy-to-understand manner relative to the accepted band.

Moreover, the display device 100 calculates an average or a minimum time of processing periods of each of the first device and the second device, and an average or a minimum time of waiting periods from an end of processing by the first device until a start of processing by the second device, based on the log information. Furthermore, the display device 100 calculates a distance based on a time difference between start times or end times of processing of the first device and the second device that is identified from the average of processing periods and the average of waiting periods, or the minimum time of processing periods and the minimum time of waiting periods of the first device and the second device. As a result, it is possible to display variations in processing periods relative to the standard time of the manufacturing line in an easy-to-understand manner.

Furthermore, the display device 100 displays a graph in which a distance is enlarged or reduced, according to a change of scale of a time axis corresponding to each device included in the manufacturing line while maintaining an angle. As a result, it is possible to display variations in processing periods for a desired time region or product.

Moreover, the display device 100 identifies a processing period and a waiting period of the third device based on log information of processing by the third device that performs processing subsequent to the second device and that is included in the manufacturing line. Furthermore, the display device 100 arranges the identified processing period and waiting period of the third device on the third time axis that is parallel to the second time axis and that indicates changes of the processing period and the waiting period of the third device. Moreover, in the display device 100, the first band connects processing periods of a product common among the first device, the second device, and the third device. Furthermore, in the display device 100, the second band connects waiting periods after processing of the product common among the first device, the second device, and the third device. Moreover, the display device 100 calculates a distance between the first time axis and the second time axis so that an angle of a line segment between the first time axis and the second time axis is a predetermined angle relative to the first time axis and the second time axis, and a distance between the second time axis and the third time axis so that an angle of a line segment between the second time axis and the third time axis is a predetermined angle relative to the second time axis and the third time axis, in each of the formed first band and second band. As a result, because a distance between respective time axes can be adjusted independently, it is possible to display variations in processing periods per region between time axes even when processing periods of respective devices differ significantly.

Furthermore, although a processing period and a waiting period are calculated based on log data, and a graph is created based on the calculated processing period and waiting period in the first embodiment described above, it is not limited thereto. For example, a graph may be created based on a manufacturing start time and a manufacturing end time of a product in each device. An embodiment in this case is explained below as a second embodiment.

[b] Second Embodiment

Figure 11:
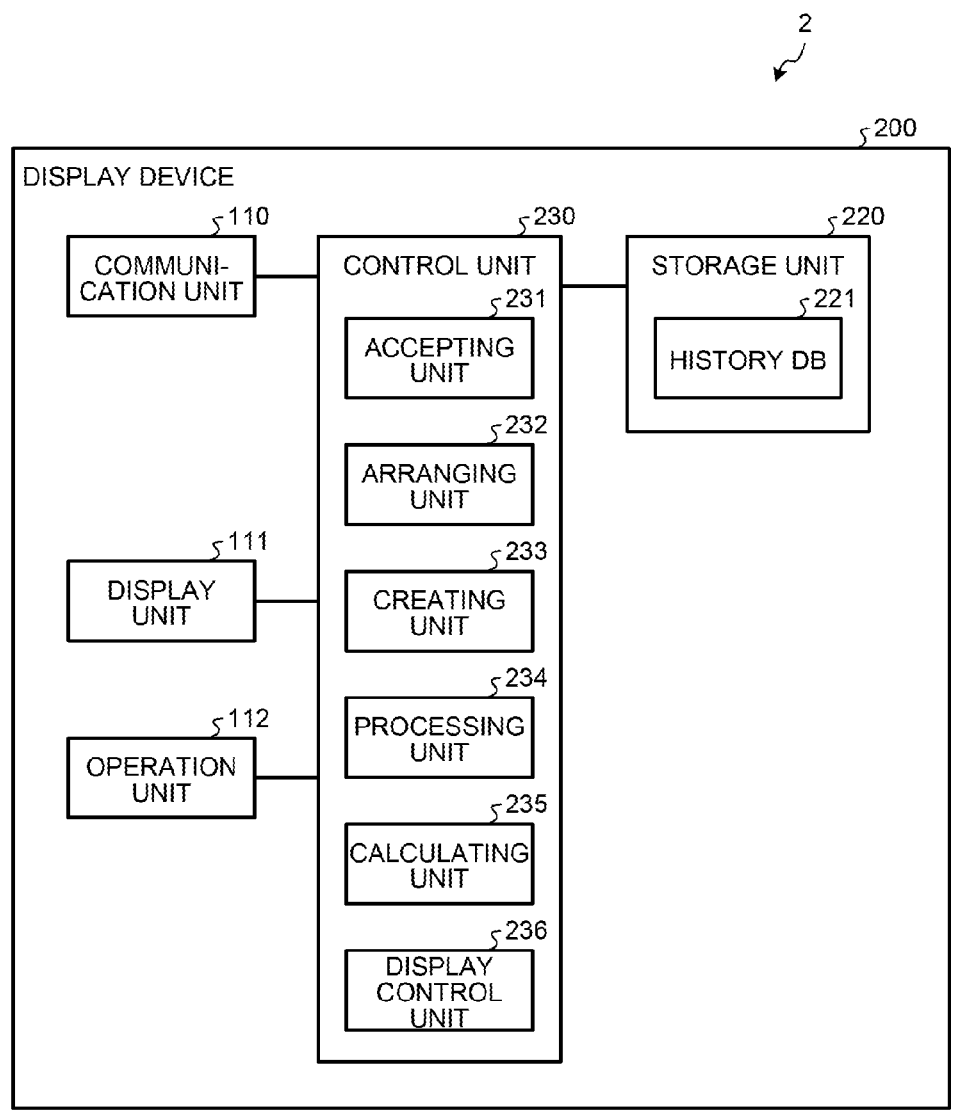
FIG. 11 is a block diagram depicting one example of a configuration of a display system of a second embodiment.

FIG. 11 is a block diagram depicting one example of a configuration of a display system of the second embodiment. By assigning common reference symbols to components identical to the display system 1 of the first embodiment, explanation of the duplicated components and operation is omitted. A point in which a display system 2 of the second embodiment differ from that display system 1 of the first embodiment is that a graph is created based on a manufacturing start time and a manufacturing end time of a product in respective devices.

The display system 2 depicted in FIG. 11 includes a display device 200. The display device 200 differs from the display device 100 in that a storage unit 220 and a control unit 230 are included in place of the storage unit 120 and the control unit 130. Moreover, the storage unit 220 differs from the storage unit 120 in that a history data base 221 is included in place of the log storage unit 121. Note that a database is abbreviated as DB in the following explanation. Furthermore, the control unit 230 differs from the control unit 130 in that an accepting unit 231, an arranging unit 232, and a creating unit 233 are included in place of the identifying unit 132 and the arranging unit 133. Moreover, the control unit 230 differs from the control unit 130 in that a processing unit 234, a calculating unit 235, and a display control unit 236 are included in place of the processing unit 134, the calculating unit 135, and the display control unit 136.

Figure 12:
FIG. 12 depicts one example of a history database (DB)

The history DB 221 is a database that stores histories in each manufacturing process of a product that is manufactured by performing manufacturing with a plurality of processes sequentially. That is, the history DB 221 stores times at which manufacturing is started and ended in each process per product as a history record. FIG. 12 depicts one example of the history DB. As depicted in FIG. 12, the history DB 221 has items such as a "product number", a "start time" and an "end time" in each process. The history DB 221 stores data, for example, handling data of each product as one record.

The "product number" is a number that is uniquely assigned to each product that is manufactured in a factory, and is an identifier to identify the product. The "start time" is information that indicates time at which manufacturing is started in a corresponding process. The "end time" is information that indicates time at which manufacturing is ended in a corresponding process. In the example in the first line in FIG. 12, it is indicated that for a product of product number "SN0001", process E started at "9:00:00" and ends at "9:00:05", process F starts at "9:00:15" and ends at "9:00:30", and process G starts at "9:0040" and ends at "9:00:48".

Returning back to explanation of FIG. 11, the accepting unit 231 accepts display of a graph when operation information indicating that a graph is to be displayed is input from the operation unit 112. Upon accepting display of a graph, the accepting unit 231 acquires log data from each device through the communication unit 110. The accepting unit 231 stores a start time and an end time out of the acquired log data in the history DB 221. Upon completion of storage of the start time and the end time, the accepting unit 231 outputs an arrangement instruction to the arranging unit 232. The accepting unit 231 may perform storage of a start time and an end time out of the log data from each device succeedingly in real time. In this case, upon storing data to display in a graph in the history DB 221, the accepting unit 231 outputs an arrangement instruction to the arranging unit 232.

Furthermore, when operation information indicating that any trace graph out of graphs being displayed, that is, a region, is selected is input from the operation unit 112, the accepting unit 231 determines whether selection of a region is accepted. When selection of a region is accepted, the accepting unit 231 outputs information about accepted selection of a region to the calculating unit 235. When selection of a region is not accepted, the accepting unit 231 outputs information indicating that a standard time is to be used to the calculating unit 235. As a case in which the accepting unit 131 determines that selection of a region is not accepted, for example, a case in which an unillustrated standard time button that is arranged in a graph being displayed is pressed is considered. Moreover, the accepting unit 231 may determine that selection of a region is not accepted based on that a predetermined time has passed since a graph based on an unadjusted is displayed.

Furthermore, when operation information indicating that a scale of a time axis of a graph is to be changed is input from the operation unit 112, the accepting unit 231 determines whether a change of scale of a time axis is accepted. When a change of scale of a time axis is accepted, the accepting unit 231 outputs scale change information for a time axis that indicates an accepted change of scale of a time axis to the display control unit 236. When a change of scale of a time axis is not accepted, the accepting unit 231 ends the processing. At this time, the display control unit 236 continues to output a display screen including the graph being displayed to the display unit 111 to be displayed. Note that the accepting unit 231 may be configured not to end the processing when a change of scale of a time axis is accepted, but to continue waiting for acceptance of a change of scale of a time axis. A case in which a change of scale of a time axis is not accepted includes, for example, a case in which a numeric value out of a scale changing range is input, and the like.

When an arrangement instruction is input from the accepting unit 231, the arranging unit 232 refers to the history DB 221 and arranges a mark indicating a start until an end of manufacturing of each product in each process on a time axis corresponding to each process in a graph. The arranging unit 232 arranges, for example, marks indicating a start until an end of manufacturing of respective products in respective processes on time axes corresponding to process E, process F, and process G. The arranging unit 232 outputs the graph in which the marks are arranged to the creating unit 233.

In other words, the arranging unit 232 arranges marks indicating a start and an end of manufacturing for one product in each of a first process and a second process subsequent to the first process out of a plurality of processes. The arranging unit 232 arranges the marks with length corresponding to a time period from the start until the end of manufacturing for each of the first process and the second process, respectively, on respective time axes extending in an identical direction. Furthermore, the arranging unit 232 arranges a mark for a third process subsequent to the second process on a time axis corresponding to the third process.

Figure 13:
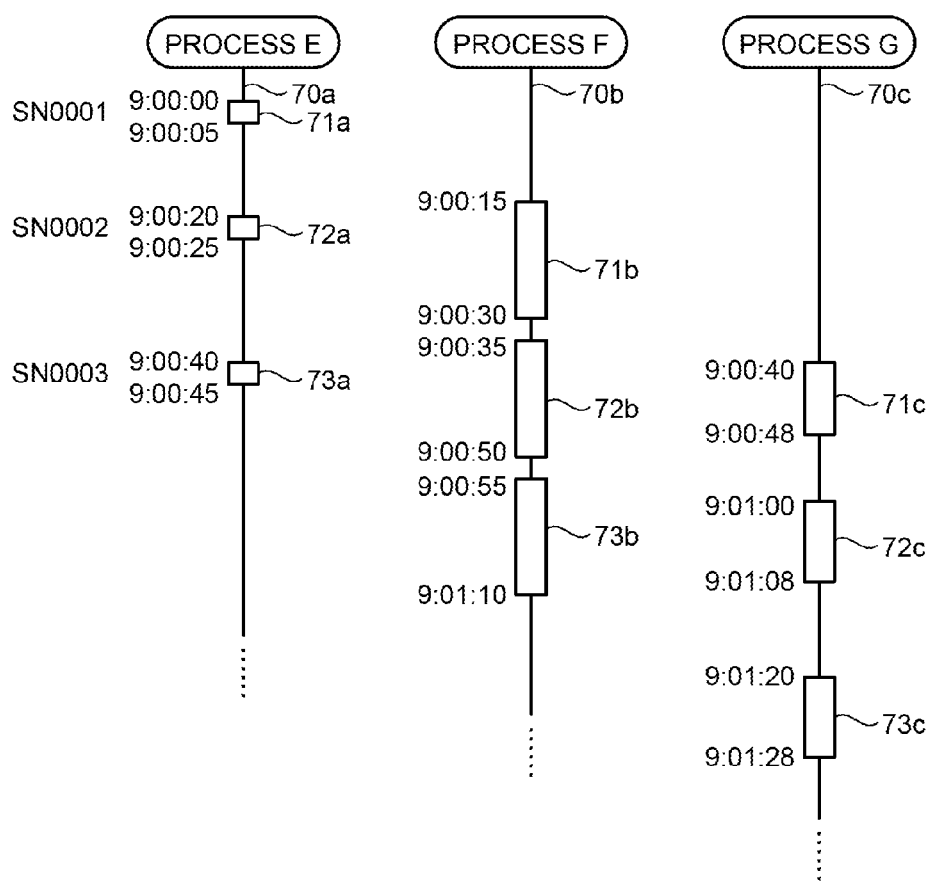
FIG. 13 depicts one example in which marks indicating a start until an end of manufacturing are arranged on a time axis.

A graph in a state in which marks are arranged on time axes is explained using FIG. 13. FIG. 13 depicts one example in which marks indicating a start until an end of manufacturing are arranged on a time axis. In the example in FIG. 13, the arranging unit 232 arranges a time axis 70a corresponding to process E, a time axis 70b corresponding to process F, and a time axis 70c corresponding to process G in a graph. Subsequently, the arranging unit 232 arranges marks indicating a start until an end of manufacturing of each product on the respective time axes corresponding to the respective processes. In the example in FIG. 13, the arranging unit 232 arranges a mark 71a corresponding to product number "SN0001" on the time axis 70a corresponding to process E at "9:00:00", which is the start time, as a start point, with the length corresponding to a time period "0:00:05" that takes until "9:00:05", which is the end time.

Moreover, the arranging unit 232 arranges a mark 72a corresponding to product number "SN0002" on the time axis 70a at "9:00:20", which is the start time, as a start point, with the length corresponding to a time period "0:00:05" that takes until "9:00:25", which is the end time. The arranging unit 232 arranges a mark 73a corresponding to product number "SN0003" on the time axis 70a at "9:00:40", which is the start time, as a start point, with the length corresponding to a time period "0:00:05" that takes until "9:00:45", which is the end time. The arranging unit 232 arranges similarly, on the time axis 70b corresponding to process F, a mark 71b, a mark 72b, and a mark 73b in this order. Furthermore, the arranging unit 232 arranges similarly, on the time axis 70c corresponding to process G, a mark 71c, a mark 72c, and a mark 73c in this order.

Returning back to explanation of FIG. 11, when the graph in which the marks are arranged is input from the arranging unit 232, the creating unit 233 creates a line segment connecting manufacturing start times of the marks arranged on the time axes of the respective processes per product, and a line segment connecting manufacturing end points of the marks. The creating unit 233 creates an unadjusted graph by arranging the respective created line segments in the input graph. The creating unit 233 outputs the created unadjusted graph to the processing unit 234 and the display control unit 236.

In other words, the creating unit 233 creates a first line segment that connects a point indicating a start of manufacturing of a first mark arranged on the time axis of the first process and a point indicating a start of manufacturing of a second mark arranged on the time axis of the second process. Moreover, the creating unit 233 creates a second line segment that connects a point indicating an end of manufacturing of the first mark and a point indicating an end of manufacturing of the second mark. The creating unit 233 further creates a third line segment that connects a start of manufacturing of the second mark arranged on the time axis of the second process and a point indicating a start of manufacturing of a third mark arranged on the time axis of the third process. Furthermore, the creating unit 233 creates a fourth line segment that connects a point indicating an end of manufacturing of the second mark and a point indicating an end of manufacturing of a third mark.

Figure 14:
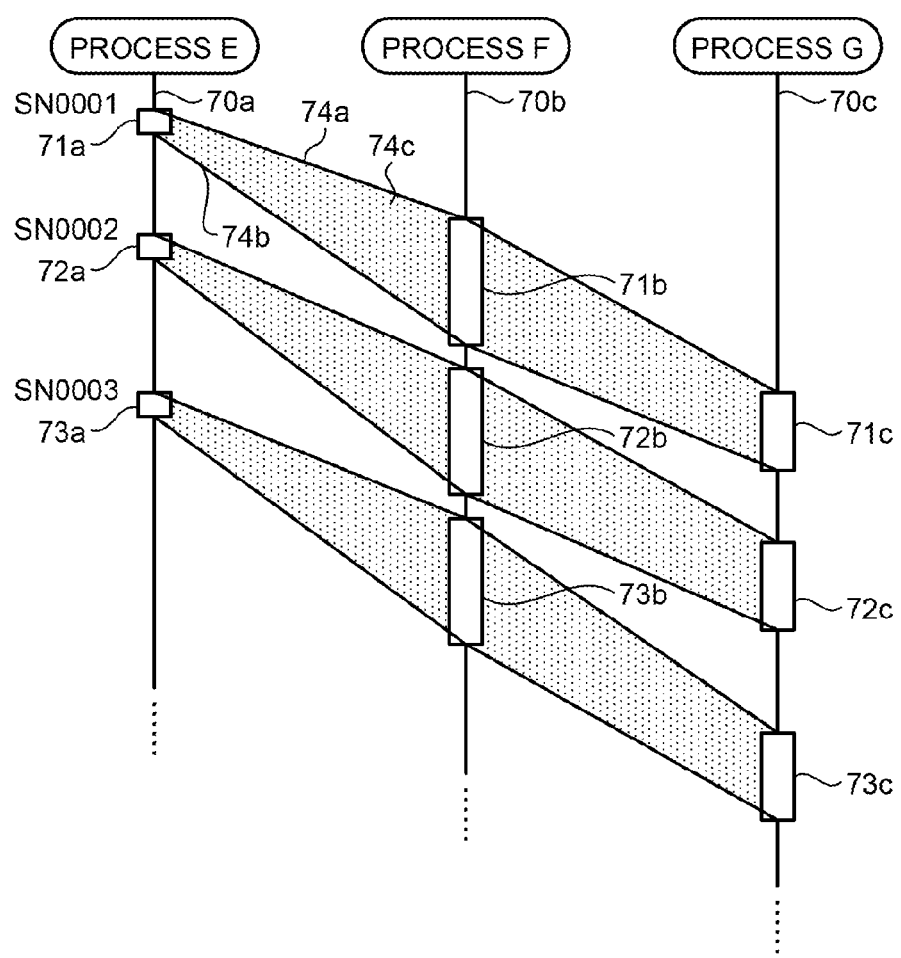
FIG. 14 depicts one example of a graph in which marks and line segments are arranged.

A graph in a state in which marks and line segments are arranged is explained using FIG. 14. FIG. 14 depicts one example of a graph in which marks and line segments are arranged. In the example of FIG. 14, the creating unit 233 creates a line segment 74a that connects a manufacturing start time of the mark 71a of process E and a manufacturing start time of the mark 71b of process F corresponding to the product of product number "SN0001". Moreover, the creating unit 233 creates a line segment 74b that connects a manufacturing end time of the mark 71a of process E and a manufacturing end time of the mark 71b of process F. A region 74c that is sectioned by the mark 71a, the line segment 74a, the mark 71b, and the line segment 74b is to be a trace graph corresponding to a processing period of the product of product number "SN0001". Furthermore, the creating unit 233 creates a line segment similarly for a portion between the mark 71b of process F and the mark 71c of process G. Moreover, the creating unit 233 creates line segments similarly for a portion between the mark 72a of process E and the mark 72b of process F, and a portion between the mark 72b of process F and the mark 72c of process G corresponding to a product of product number "SN0002". Moreover, the creating unit 233 creates line segments similarly for a portion between the mark 73a of process E and the mark 73b of process F, and a portion between the mark 73b of process F and the mark 73c of process G corresponding to a product of product number "SN0003".

Returning back to explanation of FIG. 11, when the unadjusted graph is input from the arranging unit 232, the processing unit 234 refers to the history DB 221, and calculates an average and a minimum time of processing periods in each process, and an average and a minimum time of waiting times from an end until a start of processing between respective processes. That is, the processing unit 234 calculates a standard time in the manufacturing line. The processing unit 234 outputs the calculated standard time to the calculating unit 235.

In other words, the processing unit 234 calculates an average or a minimum time of processing periods that are expressed by the marks in each of the respective first process and the second process, and an average or a minimum time of waiting periods from an end of processing in the first process until a start of processing in the second process. Moreover, the processing unit 234 calculates an average or a minimum time of processing periods expressed by the marks, and an average or a minimum time of waiting periods from an end of processing in the second process until a start of processing in the third process.

To the calculating unit 235, information indicating that the standard time is used is input from the accepting unit 231, and the standard time is input from the processing unit 234. When the information and the standard time are input, the calculating unit 235 calculates a distance between the time axes corresponding to the respective processes so that an inclination of a trace graph corresponding to the standard time is a predetermined angle, for example 45 degrees in the direction of time flow relative to a line connecting the same time on the time axes. In other words, the calculating unit 235 calculates a distance based on a time difference between start times or end times of processing of the first process and the second process that is identified from the average of processing periods and the average of waiting periods, or the minimum time of processing periods and the minimum time of waiting periods. Moreover, the calculating unit 235 calculates a distance between the time axis of the second process and the time axis of the third process so that an angle of the third line segment or the fourth line segment is a predetermined angle relative to the time axis. Calculation of a distance between time axes is the same as that of the first embodiment, and therefore, explanation thereof is omitted. The calculating unit 235 outputs the calculated distance between the time axes corresponding to the respective processes to the display control unit 236.

When selection information of a region is input from the accepting unit 231, the calculating unit 235 calculates a distance between the time axes corresponding to the respective processes with reference to the selected region, that is, the trace graph. The calculating unit 235 calculates a distance between the time axes corresponding to the respective processes, for example, so that an angle of a line segment connecting the start times of the processing periods, that is, an upper edge of the selected region, of the respective processes of the product corresponding to the selected region is 45 degrees. Calculation of a distance between time axes is the same as that of the first embodiment, and therefore, explanation thereof is omitted. The calculating unit 235 outputs the calculated distance between the time axes corresponding to the respective processes to the display control unit 236.

When the unadjusted graph is input from the creating unit 233, the display control unit 236 creates a graph in which a trace graph, that is, a region sectioned by marks and line segments, is expressed by a visible color, based on the unadjusted graph. In other words, the display control unit 236 creates a graph in which a region that is sectioned by the first mark, the first line segment, the second mark, and the second line segment is expressed with a visible color. The display control unit 236 creates a display screen including the created graph, and outputs the created display screen to the display unit 111 to be displayed.

When a distance between time axes corresponding to the respective processes is input from the calculating unit 235, the display control unit 236 creates a graph that is obtained by adjusting the unadjusted graph input from the creating unit 233 based on the distance between time axes corresponding to the respective devices. The display control unit 236 creates a display screen including the created graph, and outputs the created display screen to the display unit 111 to be displayed. Moreover, when the scale change information of a time axis is input from the accepting unit 231, the display control unit 236 changes a scale of a time axis of the graph being displayed according to the input scale change information of a time axes.

Figure 15:
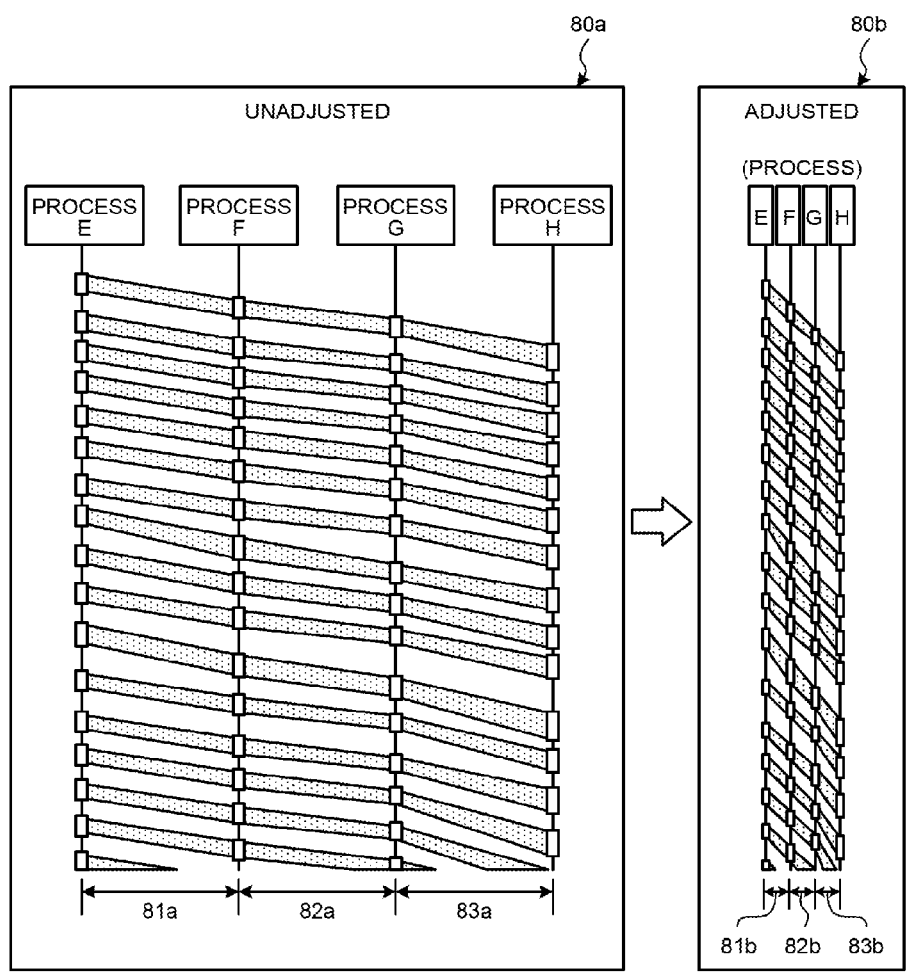
FIG. 15 depicts another example of a graph before and after adjustment when the inclination of a trace graph corresponding to a standard time is 45 degrees.

A graph in which the inclination of a trace graph corresponding to a standard time is 45 degrees in the second embodiment is explained using FIG. 15. FIG. 15 depicts another example of a graph before and after adjustment when the inclination of a trace graph corresponding to a standard time is 45 degrees. In the example in FIG. 15, a case in which a manufacturing line has four processes of process E to process H is explained. In an unadjusted graph 80a, for example, a distance 81a between a time axis of process E and a time axis of process F, a distance 82a between the time axis of process F and a time axis of process G, and a distance 83a between the time axis of process G and a time axis of process H are the same. Note that although the unadjusted graph in FIG. 15 is a graph in which a trace graph is colored based on the unadjusted graph, it is expressed as unadjusted graph for explanation's sake.

On the other hand, an adjusted graph 80b is a graph that is obtained by adjusting the unadjusted graph 80a so that the inclination of a trace graph corresponding to the standard time is 45 degrees, based on calculated distances between the time axes corresponding to the respective processes. In the adjusted graph 80b, a distance 81b between the time axis of process E and the time axis of process F is shorter than the distance 81a before adjustment, so that the inclination of the trace graph corresponding to the standard time is 45 degrees. Similarly, in the adjusted graph 80b, a distance 82b between the time axis of process F and the time axis of process G is shorter than the distance 82a before adjustment, and a distance 83b between the time axis of process G and the time axis of process H is shorter than the distance 83a before adjustment. In the adjusted graph 80b, for example, the upper edge, that is, the first line segment, of the trace graph of a product processed in the manufacturing line along the standard time is 45 degrees.

Although not illustrated, the display control unit 236 may display lines inclined by 45 degrees that indicate the inclination of a trace graph of the standard time on a rearmost layer behind a graph, similarly to the first embodiment. Moreover, although not illustrated, the display control unit 236 may make the inclination of a trace graph corresponding to a selected product 45 degrees similarly to the first embodiment. Furthermore, although not illustrated, the display control unit 236 may enlarge and reduce a distance between time axes according to a change of scale of a time axis to keep a good width of the graph, similarly to the first embodiment, to improve the visibility.

Figure 16:
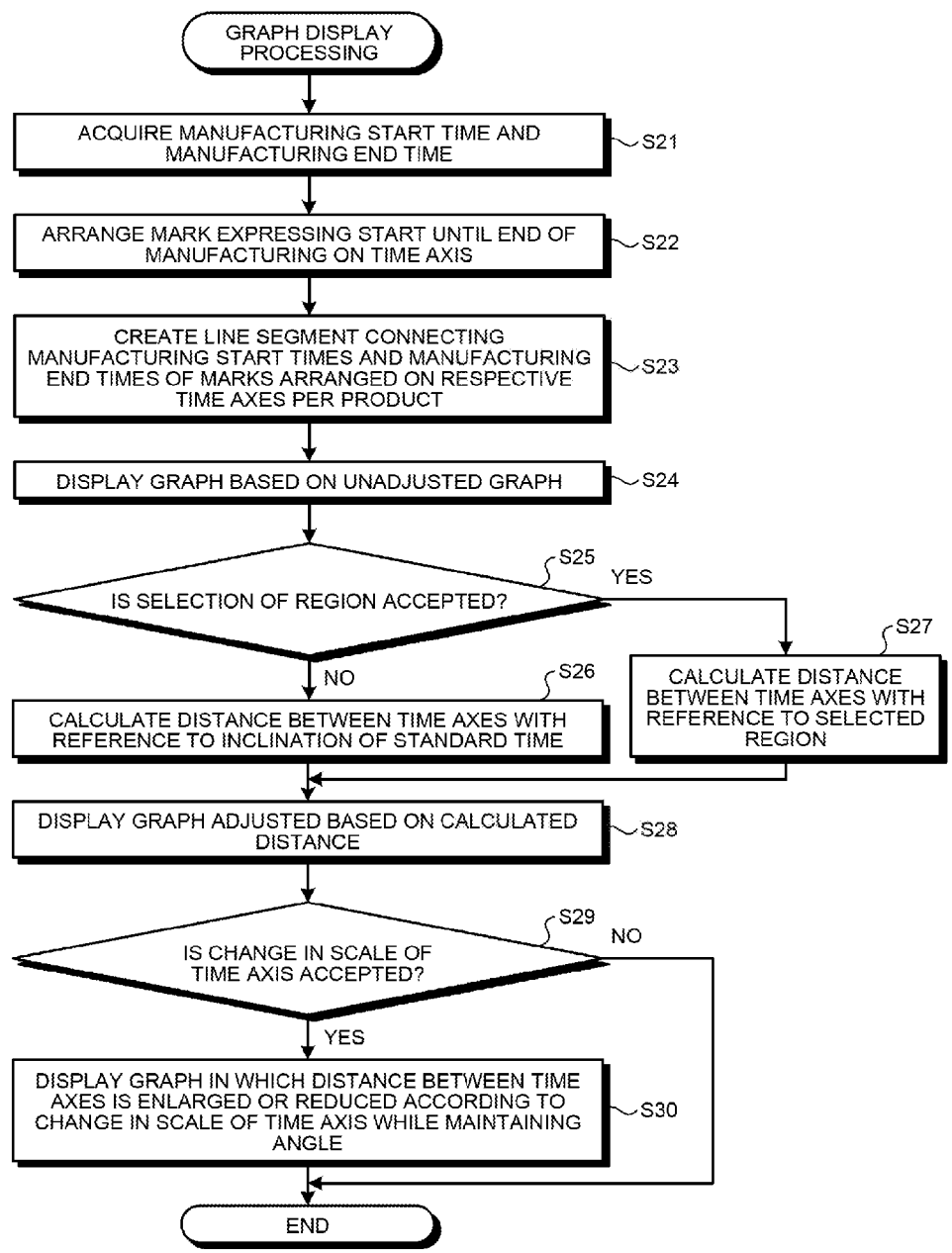
FIG. 16 is a flowchart indicating one example of a graph display processing of the second embodiment.

Next, operation of the display device 200 of the second embodiment is explained. FIG. 16 is a flowchart indicating one example of a graph display processing of the second embodiment.

When operation information indicating that a graph is to be displayed is input from the operation unit 112, the accepting unit 231 of the display device 200 accepts display of a graph. Upon accepting display of a graph, the accepting unit 231 acquires log data, that is, a manufacturing start time and a manufacturing end time, from each device through the communication unit 110 (step S21). The accepting unit 231 stores the manufacturing start time and the manufacturing end time in the history DB 221 out of the acquired log data. When storage of the manufacturing start time and the manufacturing end time is completed, the accepting unit 231 outputs an arrangement instruction to the arranging unit 232.

When the arrangement instruction is input from the accepting unit 231, the arranging unit 232 refers to the history DB 221, and arranges marks indicating a start until an end of manufacturing of each product in each process on a time axis corresponding to each process (step S22). The arranging unit 232 creates a graph in which the marks are arranged to the creating unit 233.

When the graph in which the marks are arranged is input from the arranging unit 232, the creating unit 233 creates a line segment connecting manufacturing start times of the marks arranged on the time axes of the respective processes per product, and a line segment connecting manufacturing end times of the marks (step S23). The creating unit 233 creates an unadjusted graph by arranging the formed respective line segments in the input graph. The creating unit 233 outputs the created unadjusted graph to the processing unit 234 and the display control unit 236.

When the adjusted graph is input from the creating unit 233, the display control unit 236 creates a graph in which a trace graph, that is, a region sectioned by the marks and line segments is expressed by a visible color, based on the unadjusted graph. The display control unit 236 creates a display screen including the created graph, and outputs the created display screen to the display unit 111 to be displayed (step S24). Moreover, when the unadjusted graph is input from the arranging unit 232, the processing unit 234 refers to the history DB 221, and calculates an average or a minimum time of processing periods of the respective processes, and an average or a minimum time of waiting periods from an end until a start of processing in the respective processes. That is, the processing unit 234 calculates a standard time in the manufacturing line. The processing unit 234 outputs the calculated standard time to the calculating unit 235.

When operation information indicating that either region is selected from the graph being displayed is input from the operation unit 112, the accepting unit 231 determines whether selection of a region is accepted (step S25). When selection of a region is not accepted (step S25: NO), the accepting unit 231 outputs information indicating that the standard time is used to the calculating unit 235.

To the calculating unit 235, the information indicating that the standard time is used is input from the accepting unit 231, and the standard time is input from the processing unit 234. When the information and the standard time are input, the calculating unit 235 calculates a distance between time axes corresponding to the respective processes based on the inclination of the trace graph corresponding to the standard time, that is, so that the inclination is a predetermined angle (step S26). The calculating unit 235 outputs the calculated distance between the time axes corresponding to the respective processes to the display control unit 236.

When selection of a region is accepted (step S25: YES), the accepting unit 231 outputs accepted region selection information to the calculating unit 235. When the region selection information is input from the accepting unit 231, the calculating unit 235 calculates a distance between the time axes corresponding to the respective processes with reference to the selected region (step S27). The calculating unit 235 outputs the calculated distance between the respective time axes corresponding to the respective processes to the display control unit 236.

When the distance between the time axes corresponding to the respective processes is input from the calculating unit 235, the display control unit 236 creates a graph that is obtained by adjusting the unadjusted graph input from the creating unit 233 based on the distance between the respective time axes corresponding to the respective processes. The display control unit 236 creates a display screen including the created graph, and outputs the created display screen to the display unit 111 to be displayed (step S28).

When operation information indicating that a scale of a time axis of the graph is changed is input from the operation unit 112, the accepting unit 231 determines whether a change of scale of a time axis is accepted (step S29). When a change of scale of a time axis is accepted (step S29: YES), the accepting unit 231 outputs scale change information of a time axis that indicates the accepted change of scale of a time axis to the display control unit 236. When the scale change information of a time axis is input from the accepting unit 231, the display control unit 236 changes a scale of a time axis of the graph being displayed, according to the input scale change information of a time axis. That is, the display control unit 236 creates a display screen including a graph in which a distance between time axes is enlarged and reduced according to the change of scale of a time axis while maintaining the angle of the trace graph, and outputs the created display screen to the display unit 111 to be displayed (step S30).

When a change of scale of a time axis is not accepted (step S29: NO), the accepting unit 231 ends the processing. That is, the display control unit 236 continues to output the display screen that includes the graph being displayed to the display unit 111 to be displayed. Thus, the display device 200 can display variations in processing periods in an easy-to-understand manner when a trace graph of a manufacturing line is displayed. Moreover, the display device 200 enables visual recognition of time relations of a product that is processed in a line with a plurality of manufacturing devices in being processed sequentially by the manufacturing devices. Moreover, in the manufacturing line, when a problem occurs in either one of the manufacturing devices or in a conveyance process between the devices, processing takes long time compared to a case without a problem. The display device 200 can create a graph that facilitates recognition of a part taking long processing time. Thus, the display device 200 can support responding to a problem occurring in the manufacturing line, or planning a measure to improve work efficiency and safety.

As described, the display device 200 arranges marks indicating a start until an end of manufacturing for one product in each of the first process and the second process subsequent to the first process out of a plurality of processes, with length corresponding to a time period from the start until the end of manufacturing for each of the first process and the second process, respectively, on respective time axes extending in an identical direction. Furthermore, the display device 200 creates a first line segment that connects a point indicating a start of manufacturing of a first mark arranged on the time axis of the first process and a point indicating an a start of manufacturing of a second mark arranged on the time axis of the second process. Moreover, the display device 200 creates a second line segment that connects a point indicating an end of manufacturing of the first mark and a point indicating an end of manufacturing of the second mark. Furthermore, the display device 200 calculates a distance between the time axis of the first process and the time axis of the second process so that an angle of the first line segment or the second line segment is a predetermined angle relative to the time axes. Moreover, the display device 100 displays a graph that includes lines indicating the time axes, the first mark, and the second mark, and that displays a region sectioned by the first mark, the first line segment, the second mark, and the second line segment in a visible color based on the calculated distance. As a result, it is possible to display variations in processing periods in an easy-to-understand manner.

Furthermore, the display device 200 accepts selection of either one of regions from the displayed graph. Moreover, the display device 200 calculates a distance with reference to the accepted region when calculating the distance. As a result, it is possible to display variations in processing periods of other regions in an easy-to-understand manner, with reference to the accepted region.

Furthermore, the display device 200 calculates an average or a minimum time of processing periods expressed by the marks in each of the first process and the second process, and an average or a minimum time of waiting periods from an end of processing in the first process until a start of processing in the second process. Moreover, the display device 100 calculates a distance based on a time difference between start times or end times of processing of the first process and the second process that is identified from the average of processing periods and the average of waiting periods, or the minimum time of processing periods and the minimum time of waiting periods of the first device and the second device. As a result, it is possible to display variations in processing periods relative to the standard time of the manufacturing line in an easy-to-understand manner.

Furthermore, the display device 200 displays a graph in which distances are enlarged and reduced according to a change of scale of a time axis corresponding to each process while maintaining an angle. As a result it is possible to display variations in processing periods for a desired time region or product in an easy-to-understand manner.

Moreover, the display device 200 further arranges, for the third process subsequent to the second process, a mark on a time axis corresponding to the third process. Furthermore, the display device 200 further creates a third line segment that connects a point indicating a start of manufacturing of the second mark arranged on the time axis of the second process and a point indicating a start of manufacturing of the third mark arranged on the time axis of the third process. Furthermore, the display device 200 creates a fourth line segment that connects a point indicating an end of manufacturing of the second mark and a point indicating an end of manufacturing of the third mark. Moreover, the display device 200 calculates a distance between the time axis of the second process and the time axis of the third process so that the angle of the third line segment or the fourth line segment is a predetermined angle relative to the time axes. Furthermore, the display device 200 displays a graph that includes the third mark, and that displays a region sectioned by the second mark, the third line segment, the third mark, and the fourth line segment in a visible color further based on the distance between the time axis of the second process and the time axis of the third process. As a result, because a distance between respective time axes can be adjusted independently, it is possible to display variations in processing periods in an easy-to-understand manner per time axis even when processing periods of respective devices differ significantly.

Although the processing unit 134 or the processing unit 234 calculates a standard time in the above respective embodiments, it is not limited thereto. For example, the processing unit 135 or the processing unit 235 may be configured to adjust a distance between time axes with reference to a trace graph that first appears on the time axes. This enables to reduce a processing amount when displaying a graph.

Moreover, although a trace graph is colored in the above respective embodiments, it is not limited thereto. For example, if respective trace graph can be distinguished from each other with, for example, hatching, gradation, and the like, it may be displayed in gray scale, black and white, or the like.

Furthermore, the illustrated respective components of the respective parts are not necessarily requested to be configured physically as illustrated. That is, a specific form of distribution and integration of the respective parts is not limited to the one illustrated, but all or a part thereof can be configured to be distributed or integrated functionally or physically in an arbitrary unit according to various kinds of load, use conditions, or the like. For example, the identifying unit 132 and the arranging unit 133 of the first embodiment may be integrated. Moreover, the arranging unit 232 and the creating unit 233 of the second embodiment may be integrated.

Furthermore, the respective processing functions performed by the respective devices may be arranged such that all or an arbitrary part thereof is executed on a CPU (or a microcomputer such as a MPU and a micro controller unit (MCU)). Moreover, it is needless to say the respective processing functions may be arranged such that all or an arbitrary part thereof is performed on a program that is analyzed and executed on a CPU (or a microcomputer such as an MPU and a MCU), or on hardware by wired logic.

Figure 17:
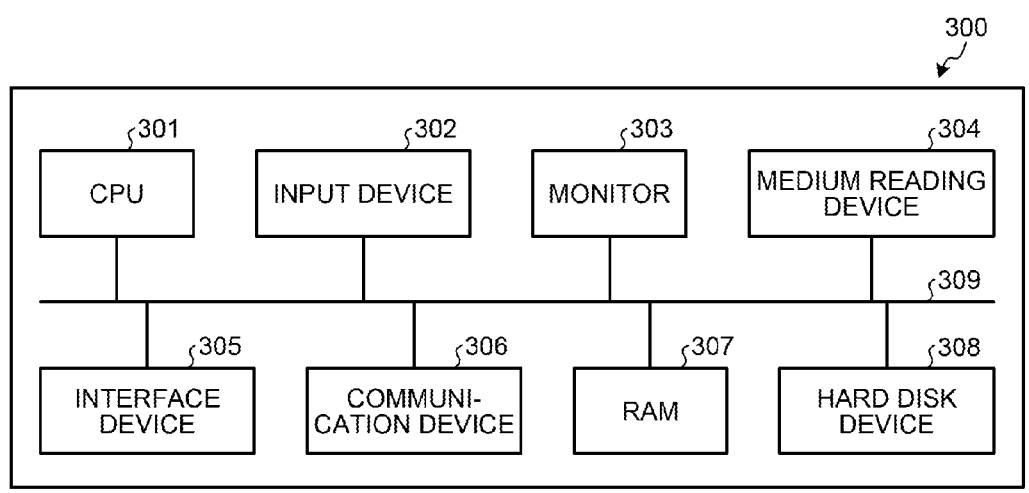
FIG. 17 depicts one example of a computer that executes a display program.

Various kinds of processing explained in the respective embodiments described above can be implemented by executing a program that is prepared in advance by a computer. In the following, one example of a computer that executes a program that has similar functions as the above respective embodiments is explained. FIG. 17 depicts one example of a computer that executes a display program.

As depicted in FIG. 17, a computer 300 includes a CPU 301 that executed various kinds of arithmetic processing, an input device 302 that accepts data input, and a monitor 303. Moreover, the computer 300 includes a medium reading device 304 that reads a program and the like from a recording medium, an interface device 305 to connect various devices, and a communication device 306 to connect with another information processing device and the like with a wire or wirelessly. Furthermore, the computer 300 includes a random access memory (RAM) 307 that temporarily stores various kinds of information, and a hard disk device 308. Moreover, the respective devices 301 to 308 are connected to a bus 309.

In the hard disk device 308, a display program having similar functions as the respective processing units of the accepting unit 131, the identifying unit 132, the arranging unit 133, the processing unit 134, the calculating unit 135, and the display control unit 136 depicted in FIG. 1 is stored. Furthermore, in the hard disk device 308, a display program having similar functions as the respective processing units of the accepting unit 231, the arranging unit 232, the creating unit 233, the processing unit 234, the calculating unit 235, and the display control unit 236 depicted in FIG. 11 may be stored. Moreover, in the hard disk device 308, the log storage unit 121 or the history DB 221, and various kinds of data to implement the display program are stored. The input device 302 accepts, for example, various kinds of information such as operation information and management information from an administrator of the computer 300. The monitor 303 displays, for example, a display screen, a screen of management information, and various kinds of screens to the administrator of the computer 300. To the interface device 305, for example, a printing device and the like are connected. The communication device 306 has, for example, a similar function as that of the communication unit 110 depicted in FIG. 1, and is connected to an unillustrated network to communicate various kinds of information with various devices.

The CPU 301 reads respective programs that are stored in the hard disk device 308, and develops on the RAM 307 to execute the programs, thereby performs various kinds of processing. Moreover, these programs can cause the computer 300 to function as the accepting unit 131, the identifying unit 132, the arranging unit 133, the processing unit 134, the calculating unit 135, and the display control unit 136 depicted in FIG. 1. Furthermore, these programs may cause the computer 300 to function as the accepting unit 231, the arranging unit 232, the creating unit 233, the processing unit 234, the calculating unit 235, and the display control unit 236 depicted in FIG. 11.

The above display program is not necessarily requested to be stored in the hard disk device 308. For example, a program that is stored in a recording medium that can be read by the computer 300 may be read by the computer 300 to be executed. The recording medium that can be read by the computer 300 corresponds to, for example, a transportable recording medium such as a compact-disc read-only memory (CD-ROM), a digital versatile disk (DVD), and a universal serial bus (USB) memory, a semiconductor memory such as a flash memory, a hard disk drive, and the like. Furthermore, this display program may be stored in a device connected to a public circuit, the Internet, a local area network (LAN), and the like, and may be read by the computer 300 from these to be executed.

It is possible to display variations in processing periods in an easy-to-understand manner.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display system comprising at least a display device, wherein
the display device includes:
a processor configured to execute a process including:
identifying a processing period and a waiting period of a first device and a processing period and a waiting period of a second device based on log information of processing in the first device that is included in a manufacturing line and log information of processing in the second device that performs processing subsequent to the first device and that is included in the manufacturing line;
arranging the processing period and the waiting period of the first device identified on a first time axis that indicates changes of the processing period and the waiting period in the first device, arranging the processing period and the waiting period in the second device identified on a second time axis that is parallel to the first time axis and that indicates changes of the processing period and the waiting period in the second device, and forming a first band and a second band, the first band connecting processing periods for a product common between the first device and the second device, the second band connecting waiting periods after processing of the product common between the first device and the second device;
first calculating a distance between the first time axis and the second time axis so that an angle of any one of the first band and the second band formed at the arranging is a predetermined angle relative to the first time axis or the second time axis or a combination thereof; and
displaying a graph in which transitions of the processing period and the waiting period are expressed with different band stripes based on the distance calculated at the first calculating.

2. The display system according to claim 1, wherein
the process further includes accepting selection of either one of the bands from the graph displayed, and the first calculating includes calculating the distance with reference to the band accepted at the accepting when calculating the distance.

3. The display system according to claim 1, wherein the process further includes second calculating, based on the log information, any one of an average and a minimum time of a processing period of each of the first device and the second device, and any one of an average and a minimum time of a waiting period from an end of processing in the first device until a start of processing in the second device, and the first calculating includes calculating the distance based on a time difference in any one of start time and end time of processing between the first device and the second device that is identified by any set of the average of the processing period and the average of the waiting period, and the minimum time of the processing period and the minimum time of the waiting period calculated at the second calculating.

4. The display system according to claim 1, wherein the displaying includes displaying a graph in which the distance is enlarged and reduced according to a change of scale of a time axis corresponding to each device that is included in the manufacturing line while maintaining the angle.

5. The display system according to claim 1, wherein the identifying further includes identifying a processing period and a waiting period of a third device based on log information of processing in the third device that performs processing subsequent to the second device and that is included in the manufacturing line, the arranging further includes arranging the processing period and the waiting period of the third device identified on a third time axis that is parallel to the second time axis and that indicates changes of the processing period and the waiting period in the third device, the first band further connects processing periods for a product common among the first device, the second device, and the third device, the second band further connects waiting periods after processing of the product common among the first device, the second device, and the third device, and the first calculating further includes calculating a distance between the first time axis and the second time axis so that an angle of a line segment between the first time axis and the second time axis is a predetermined angle relative to the first time axis and the second time axis, and a distance between the second time axis and the third time axis so that an angle of a line segment between the second time axis and the third time axis is a predetermined angle relative to the second time axis and the third time axis, in each of the first band and the second band formed at the arranging.

6. A display system comprising at least a display device, wherein the display device includes:
a processor configured to execute a process including:
arranging, for a first process out of a plurality of processes and a second process subsequent to the first process, a mark indicating a start until an end of manufacturing for one product with length corresponding to a time period taking from a start until an end of the manufacturing on a time axis that extends in an identical direction for the first process and the second process;

creating a first line segment and a second line segment, the first line segment connecting a point that indicates a start of manufacturing of a first mark arranged on a time axis of the first process and a point that indicates a start of manufacturing of a second mark arranged on a time axis of the second process, the second line segment connecting a point that indicates an end of manufacturing of the first mark and a point that indicates an end of manufacturing of the second mark;

first calculating a distance between a time axis for the first process and a time axis for the second process so that an angle of any one of the first line segment and the second line segment created at the creating is a predetermined angle relative to the time axis; and displaying a graph that is a graph including lines indicating the time axes, the first mark, and the second mark, and in which a region sectioned by the first mark, the first line segment, the second mark, and the second line segment is displayed in a visible color, based on the distance calculated at the first calculating.

7. The display system according to claim 6, wherein the process further includes accepting selection of either one of the region from the displayed graph, and the first calculating includes calculating the distance with reference to the region accepted at the accepting when calculating the distance.

8. The display system according to claim 6, wherein the process further includes second calculating any one of an average and a minimum time of a processing period that is expressed by the mark, and any one of an average and a minimum time of a waiting period from an end of processing in the first process until a start of processing in the second process, for each of the first process and the second process, and the first calculating includes calculating the distance based on a time difference in any one of start time and end time between the first process and the second process that is identified from any set of the average of the processing period and the average of the waiting period, and the minimum time of the processing period and the minimum time of the waiting period calculated at the second calculating.

9. The display system according to claim 6, wherein the displaying includes displaying a graph in which the distance is enlarged and reduced according to a change of scale of a time axis corresponding to each process while maintaining the angle.

10. The display system according to claim 6, wherein the arranging further includes arranging, for a third process subsequent to the second process, the mark on a time axis corresponding to the third process, the creating further includes creating a third line segment that connects the point indicating the start of manufacturing of the second mark arranged on the time axis of the second process and a point indicating a start of manufacturing of a third mark arranged on the time axis of the third process, and a fourth line segment that connects a point indicating the end of manufacturing of the second mark and the point indicating the end of manufacturing of the third mark, the first calculating further includes calculating a distance between the time axis for the second process and the time axis for the third process so that an angle of any one of the third line segment and the fourth line segment is a predetermined angle relative to the time axis, and the displaying further includes displaying a graph that is a graph including the third line segment, and in which a region sectioned by the second mark, the third line segment, the third mark, and the fourth line segment is displayed in a visible color, based on the distance between the time axis for the second process and the time axis for the third process.

11. A non-transitory computer-readable recording medium storing a display program that causes a computer to execute a process comprising:

identifying a processing period and a waiting period of a first device and a processing period and a waiting period of a second device based on log information of processing in the first device that is included in a manufacturing line and log information of processing in the second device that performs processing subsequent to the first device and that is included in the manufacturing line;

arranging the processing period and the waiting period of the first device identified, on a first time axis that indicates changes of the processing period and the waiting period in the first device;

arranging the processing period and the waiting period in the second device identified, on a second time axis that is parallel to the first time axis and that indicates changes of the processing period and the waiting period in the second device;

forming a first band and a second band, the first band connecting processing periods for a product common between the first device and the second device, the second band connecting waiting periods after processing of the product common between the first device and the second device;

calculating a distance between the first time axis and the second time axis so that an angle of any one of the first band and the second band formed at the forming is a predetermined angle relative to the first time axis or the second time axis or a combination thereof; and displaying a graph in which transitions of the processing period and the waiting period are expressed with different band stripes based on the distance calculated at the calculating.

12. A non-transitory computer-readable recording medium storing a display program that causes a computer to execute a process comprising:

arranging, for a first process out of a plurality of processes and a second process subsequent to the first process, a mark indicating a start until an end of manufacturing for one product with width corresponding to a time period taking from a start until an end of the manufacturing on a time axis that extends in an identical direction for the first process and the second process;

creating a first line segment and a second line segment, the first line segment connecting a point that indicates a start of manufacturing of a first mark arranged on a time axis of the first process and a point that indicates a start of manufacturing of a second mark arranged on a time axis of the second process, the second line segment connecting a point that indicates an end of manufacturing of the first mark and a point that indicates an end of manufacturing of the second mark;

calculating a distance between a time axis for the first process and a time axis for the second process so that an angle of any one of the first line segment and the second line segment created at the creating is a predetermined angle relative to the time axis; and displaying a graph in which lines indicating the time axes, the first mark, the second mark, and a region sectioned by the first mark, the first line segment, the second mark, and the second line segment are displayed in a visible color, based on the distance calculated at the calculating the distance.

* * * * *